(12) United States Patent
Evans et al.

(10) Patent No.: US 9,950,243 B2
(45) Date of Patent: Apr. 24, 2018

(54) POWERED SKATEBOARD

(71) Applicant: Inboard Sports, Soquel, CA (US)

(72) Inventors: Ryan Evans, San Francisco, CA (US); Theodore Cerboneschi, San Francisco, CA (US)

(73) Assignee: Inboard Technology, Inc., Soquel, CA (US)

( * ) Notice: Subject to any disclaimer, the term of this patent is extended or adjusted under 35 U.S.C. 154(b) by 0 days.

(21) Appl. No.: 15/360,878

(22) Filed: Nov. 23, 2016

(65) Prior Publication Data
US 2017/0144056 A1  May 25, 2017

Related U.S. Application Data

(60) Provisional application No. 62/260,203, filed on Nov. 25, 2015.

(51) Int. Cl.
*A63C 17/12* (2006.01)
*A63C 17/01* (2006.01)
*B60K 7/00* (2006.01)
*B62D 65/02* (2006.01)
*G05D 1/02* (2006.01)

(52) U.S. Cl.
CPC ............ *A63C 17/12* (2013.01); *A63C 17/015* (2013.01); *B60K 7/0007* (2013.01); *B62D 65/02* (2013.01); *G05D 1/0276* (2013.01); *A63C 2203/12* (2013.01); *A63C 2203/22* (2013.01); *B60K 2007/0092* (2013.01); *B60Y 2200/91* (2013.01)

(58) Field of Classification Search
CPC ................. A63C 17/01–17/017; B60K 7/0007
See application file for complete search history.

(56) References Cited

U.S. PATENT DOCUMENTS

| 5,330,026 | A | 7/1994 | Hsu et al. |
| 6,050,357 | A * | 4/2000 | Staelin ................. A63C 17/004 180/181 |
| 6,802,636 | B1 | 10/2004 | Bailey, Jr. |
| 7,293,622 | B1 * | 11/2007 | Spital ..................... A63C 17/12 180/180 |
| 8,430,192 | B2 † | 4/2013 | Gillett |
| 9,586,471 | B2 † | 3/2017 | Gillett |
| 9,616,318 | B2 * | 4/2017 | Rogers ................... A63C 17/12 |
| 9,653,973 | B1 * | 5/2017 | Doerksen ............. B60K 7/0007 |
| 9,707,470 | B2 * | 7/2017 | Ma ........................ B62K 11/007 |
| 2006/0032682 | A1 * | 2/2006 | Hillman ................. A63C 17/12 180/65.1 |
| 2006/0049595 | A1 | 3/2006 | Crigler et al. |
| 2006/0170174 | A1 * | 8/2006 | Hiramatsu ......... A63C 17/0033 280/87.041 |
| 2010/0222941 | A1 | 9/2010 | Chang |
| 2011/0162896 | A1 † | 7/2011 | Gillett |
| 2013/0081891 | A1 | 4/2013 | Ulmen et al. |
| 2014/0262574 | A1 | 9/2014 | Rodgers |
| 2014/0277888 | A1 | 9/2014 | Dastoor et al. |

(Continued)

*Primary Examiner* — Erez Gurari
(74) *Attorney, Agent, or Firm* — Mintz Levin Cohn Ferris Glovsky and Popeo, P.C.

(57) ABSTRACT

A powered skateboard having a powered wheel. The powered wheel formed of a motor within tire of the wheel. The powered wheel fixed to a truck of the powered skateboard. The powered skateboard including at least one onboard battery to provide electrical power to the powered wheel.

16 Claims, 19 Drawing Sheets

(56) References Cited

U.S. PATENT DOCUMENTS

| | | | |
|---|---|---|---|
| 2014/0318879 A1† | 10/2014 | Gillett | |
| 2014/0326525 A1* | 11/2014 | Doerksen | A63C 17/12 180/181 |
| 2015/0045178 A1* | 2/2015 | Chan | B60W 10/196 477/4 |
| 2016/0121198 A1* | 5/2016 | Doerksen | A63C 17/01 701/22 |
| 2017/0106737 A1† | 4/2017 | Gillett | |
| 2017/0106738 A1† | 4/2017 | Gillett | |
| 2017/0106739 A1* | 4/2017 | Gillett | B60K 7/0007 |
| 2017/0113122 A1* | 4/2017 | Ji | A63C 17/12 |
| 2017/0144056 A1* | 5/2017 | Evans | A63C 17/015 |
| 2017/0151490 A1* | 6/2017 | Doerksen | A63C 17/12 |
| 2017/0157497 A1* | 6/2017 | Doerksen | A63C 17/12 |
| 2017/0165561 A1* | 6/2017 | Rogers | A63C 17/12 |

\* cited by examiner
† cited by third party

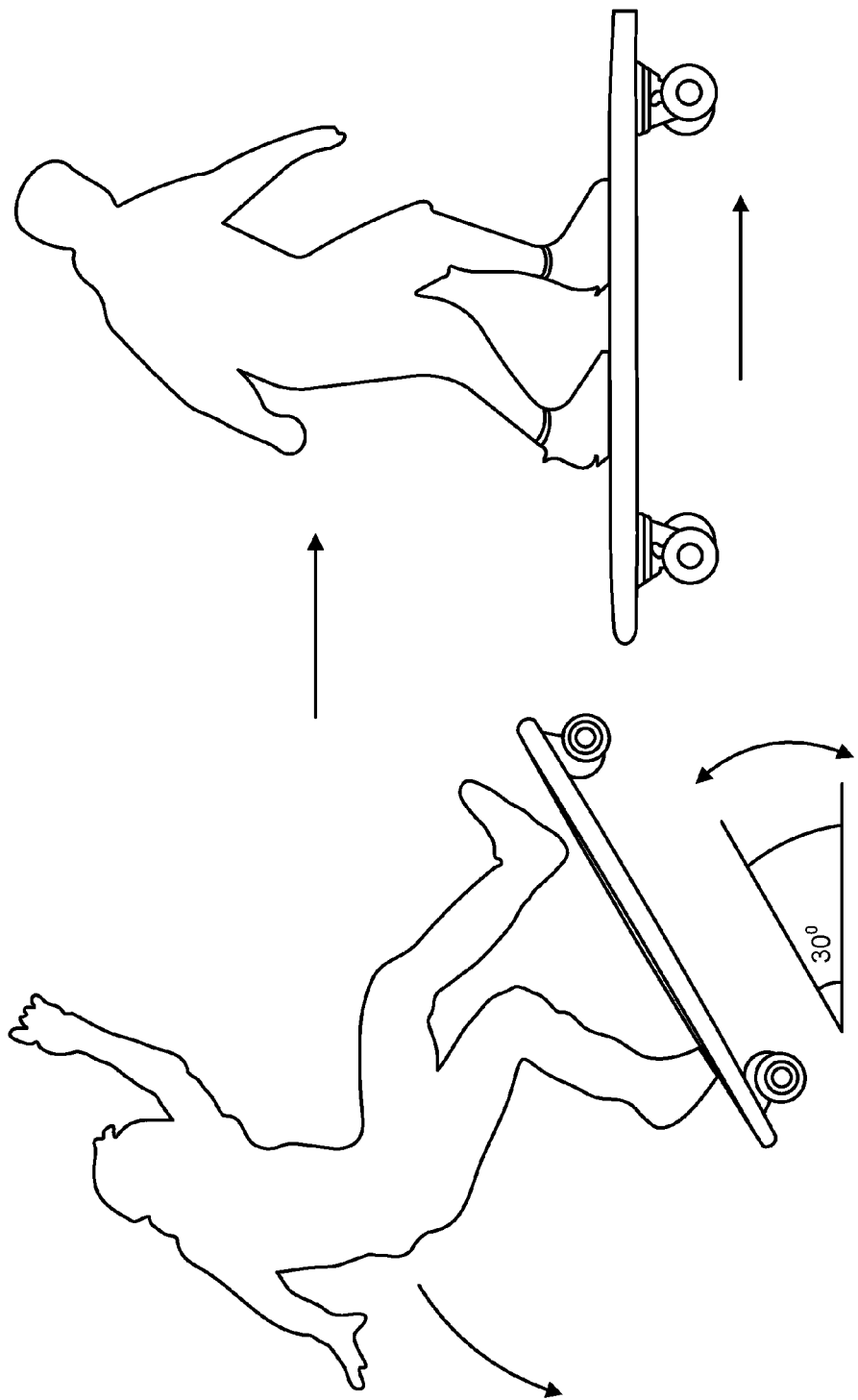

POWERED SKATEBOARD

CROSS-REFERENCE TO RELATED APPLICATIONS

This application claims priority to and the benefit of U.S. Provisional Patent Application No. 62/260,203, filed on Nov. 25, 2015, entitled "Powered Skateboard," the disclosure of which is incorporated herein in its entirety for all purposes.

TECHNICAL FIELD

The subject matter described herein relates to skateboards and in particular to powered skateboards.

BACKGROUND

Skateboards typically include an elongated board, sometimes referred to as a deck, having an upper surface and a lower surface. The upper surface typically support the feet of a rider of the skateboard and the lower surface typically have two trucks attached to the deck disposed toward either end of the deck. The upper surface may support the rider who is sitting on the skateboard. The trucks typically include one or more axles. Wheels, typically one on either side of the truck, attach to the axles. The trucks typically provide several degrees of freedom to the wheels relative to the skateboard deck, allowing the wheels to roll over uneven ground and facilitate turning of the skateboard by the rider.

Skateboards typically require the rider to provide the propelling force to move the skateboard, usually by the rider having one foot on the deck of the skateboard and another pushing off from the ground.

Some skateboards have been developed that include a power source. The power source may be a gasoline powered engine. The power source may be an electrically-powered motor. Typically, such power sources are appended to the underside of the skateboard deck or rest on top of the skateboard deck. These power source is typically separate from the wheels of the skateboard and connected to the wheels by gears, chain or pulley. Such power systems can adversely affect the distribution of mass and are also aesthetically displeasing.

SUMMARY

In one aspect, a powered skateboard may comprise a skateboard deck. The skateboard deck may comprise a bottom portion. The bottom portion may have truck mounting portions configured to facilitate engagement with one or more skateboard trucks. The skateboard deck may comprise a top portion. The top portion may have an upper surface. The upper surface may be configured to support a rider of the powered skateboard. The skateboard deck may have a cavity. The cavity may be disposed between the bottom portion and the top portion of the skateboard deck. The cavity may be adapted to store one or more components of the powered skateboard.

In another aspect, a method of making a deck for a powered skateboard is provided. The method for making a deck of a powered skateboard may include providing a first mold for a bottom portion of the skateboard deck. The first mold may provide truck mounting portions. The truck mounting portions may be configured to allow the bottom portion of the skateboard deck to facilitate engagement with one or more skateboard trucks. A second mold may be provided for a top portion of the skateboard deck. The second mold may be configured to cause the top portion of the skateboard deck to have an upper surface to support a rider of the skateboard. The first mold may be used to create the bottom portion of the skateboard deck from a moldable material. The second mold may be used to create the top portion of the skateboard deck from the moldable material. The first mold and the second mold may be configured to form a cavity between the bottom portion and the top portion of the skateboard deck when the bottom portion and the top portion are coupled together.

The top portion and the bottom portion of the skateboard deck may be coupled together by one or more of sonically securing, using screws, using an adhesive, and/or other coupling methods.

In another aspect, a method of making a deck for a powered skateboard is provided. The method may comprise providing a mold for a skateboard deck having an inner surface. The inner surface may be configured to facilitate molding of a skateboard deck. The skateboard deck may include a top portion adapted to support a rider of the powered skateboard. The skateboard deck may include a bottom portion having truck mounting portions configured to facilitate engagement with one or more skateboard trucks. The skateboard deck may include a cavity between the top portion and the bottom portion of the skateboard deck.

The method of making a deck for a powered skateboard may comprise introducing a moldable material into the mold for the skateboard deck. The moldable material may be caused to coat the inner surface of the skateboard deck. An inflatable bladder may be introduced into the mold for the skateboard deck. The inflatable bladder may be inflated inside the mold to cause the moldable material to be pressed against the inner surface of the mold and take the shape of the inner surface of the mold.

The method of making a deck for a powered skateboard may optionally include forming an aperture in the top portion of the skateboard deck.

In some variations one or more of the following features can optionally be included in any feasible combination. The top portion of the skateboard deck may include an aperture. The aperture may be configured to facilitate access to the cavity between the top portion and the bottom portion of the skateboard deck. The lid may be configured to cover the aperture and provide support to a rider of the powered skateboard. The lid may be configured to be screwed in place to cover the aperture and provide support to the rider. The lid may be configured to attach to the top portion of the skateboard deck via a hinge. The top portion of the skateboard deck may comprise slots to engage with the lid, such that the lid may slide into the slots and cover the cavity of the skateboard deck and support the rider.

The top portion of the skateboard deck may comprise multiple apertures. One aperture may be configured to facilitate access to components of the powered skateboard that may be regularly removed. Such regularly removed components may include a fuel source for the powered deck and/or a container for the fuel source of the powered deck. Another aperture may be configured to facilitate access to components of the skateboard deck that are not regularly removed. Such components not regularly removed may be control systems for controlling the powered skateboard.

The skateboard deck may include one or more conduits. The one or more conduits may be configured to facilitate connections between the power source and the motive source for the skateboard. The one or more conduits may be configured to facilitate connections between an electrical power source disposed in the cavity of the skateboard deck and one or more electric motors. The one or more conduits may be configured to facilitate connections between an electrical power source and LED lighting, camera(s), LIDAR systems, or the like.

The components stored in the cavity between the top portion and the bottom portion may include a receiver. The received may be adapted to receive instructions from a user to control the electronic skateboard. Instructions may be received from a transmitter.

The skateboard deck may include a port aperture. The port aperture may be configured to secure an electronic port into the skateboard deck. The electronic port may be one or more of a USB port, a FireWire port, and/or other electronic port. The electronic port may be configured to facilitate communications between an external device and one or more components of the powered skateboard. The electronic port may be configured to facilitate transfer of electrical energy to one or more components of the powered skateboard. The electronic port may be configured to facilitate transfer of electrical energy from one or more components of the powered skateboard to an external device.

The top portion of the skateboard deck may be secured to the bottom portion of the skateboard deck. The top portion of the skateboard deck may be secured to the bottom portion of the skateboard deck by one or more of screws, adhesive, welding, mechanically fastening, and/or other securing mechanism. The top portion of the skateboard deck may be contiguous with the bottom portion of the skateboard deck. The skateboard deck may have a monocoque structure.

The skateboard deck may comprise injection molded plastic. The skateboard deck may comprise carbon fiber. The skateboard deck may comprise forged carbon fiber. The skateboard deck may comprise pre-preg carbon fiber. The skateboard deck may comprise wood. The skateboard deck may comprise of one or more of plastic, wood, carbon fiber, pre-preg carbon fiber, or the like.

The powered skateboard may be electrically powered. The one or more components stored in the cavity between the top portion and the bottom portion may include a power source for providing electric power to one or more electric motors of the electrically-powered skateboard. The power source may include a battery pack.

A battery pack contemplated by the current subject matter may be interchangeable. The battery pack contemplated by the current subject matter may have a width suitable to fit within the cavity of the skateboard deck for the presently disclosed powered skateboard. The battery pack contemplated by the current subject matter may have a length suitable to fit between the front and back truck mounting portions of the skateboard deck. The battery pack contemplated may be configured to be removable from the skateboard deck. For example, when a battery pack has been depleted it may be exchanged for a charged battery pack. The battery pack may have multiple cells. The battery pack may include a casing. The casing may have a shape and/or dimensions adapted to secure the battery pack within one or more cavities of the skateboard deck.

The current subject matter contemplates multiple different battery packs having different amounts of electrical charge stored in them. The multiple different battery packs may comprise an outer case having substantially similar dimensions. The multiple different battery packs having outer cases having substantially similar dimensions may facilitate the multiple different battery packs to be secured within the cavity of the skateboard deck.

Implementations of the current subject matter can provide one or more advantages. For example, providing a streamlined skateboard deck for a powered skateboard. The current subject matter may also provide an aesthetically pleasing skateboard deck for a powered skateboard. Implementations of the current subject matter can also provide the advantage of continued use of the powered skateboard. Riders are no longer limited to the power of a single battery pack.

The details of one or more variations of the subject matter described herein are set forth in the accompanying drawings and the description below. Other features and advantages of the subject matter described herein will be apparent from the description and drawings, and from the claims. Certain features of the currently disclosed subject matter are described for illustrative purposes only and it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 16A illustrates an example of the powered skateboard in the manual position; and FIG. 16B is an illustration of the powered skateboard after an accidental manual has been corrected.

When practical, similar reference numbers denote similar structures, features, or elements.

DETAILED DESCRIPTION

Figure 1:
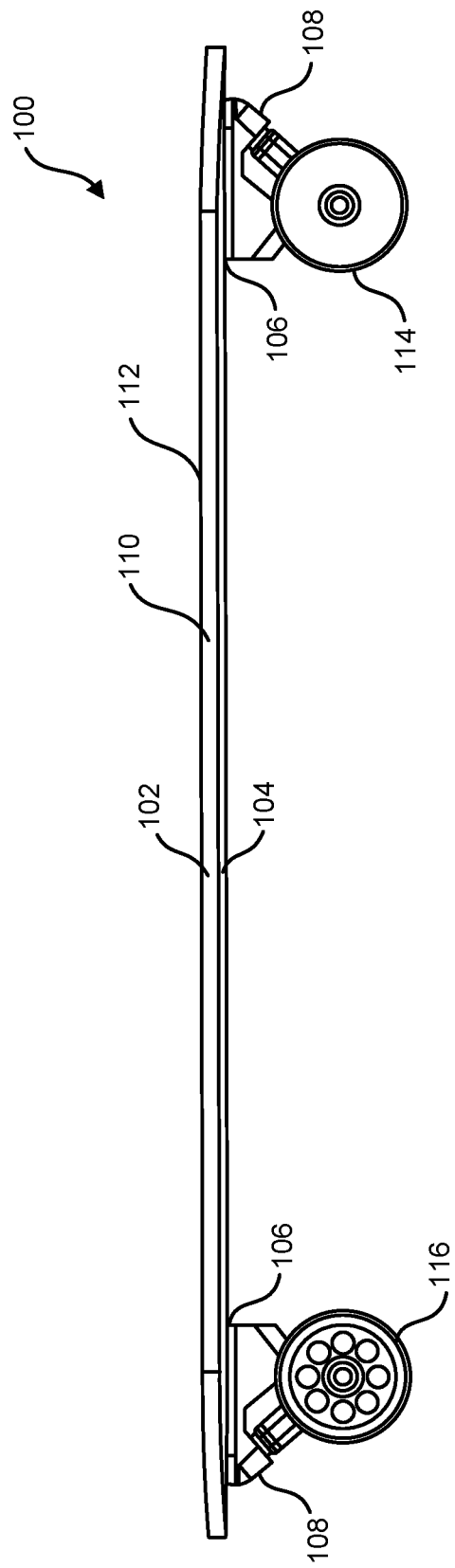
FIG. 1 is a schematic view of various elements of the skateboard, having one or more features consistent with implementations of the current subject matter.

FIG. 1 is a schematic view of various elements of the skateboard 100, having one or more features consistent with implementations of the current subject matter. The skateboard 100 can comprise a skateboard deck 102. The skateboard deck 102 may comprise a bottom portion 104. The bottom portion 104 may have truck-mounting portions 106 configured to facilitate engagement with one or more skateboard trucks 108. The skateboard deck 102 may comprise a top portion 110. The top portion 110 may have an upper surface 112. The upper surface 112 may be configured to support a rider of the skateboard 100.

The one or more skateboard trucks 108 can be configured to support one or more wheels 114 and 116. In some variations, the skateboard trucks 108 may be configured to support unpowered wheels 114 and/or powered wheels 116. The powered wheels 116 can be disposed on both front and rear trucks 108 of the skateboard 100, or can be disposed on just one of the trucks 108. The powered wheels 116 can be disposed on one side or on both sides of the truck(s) 108. The powered wheels 116 can be disposed on the truck 108 that is located on the rear portion of the skateboard 100.

Figure 2:
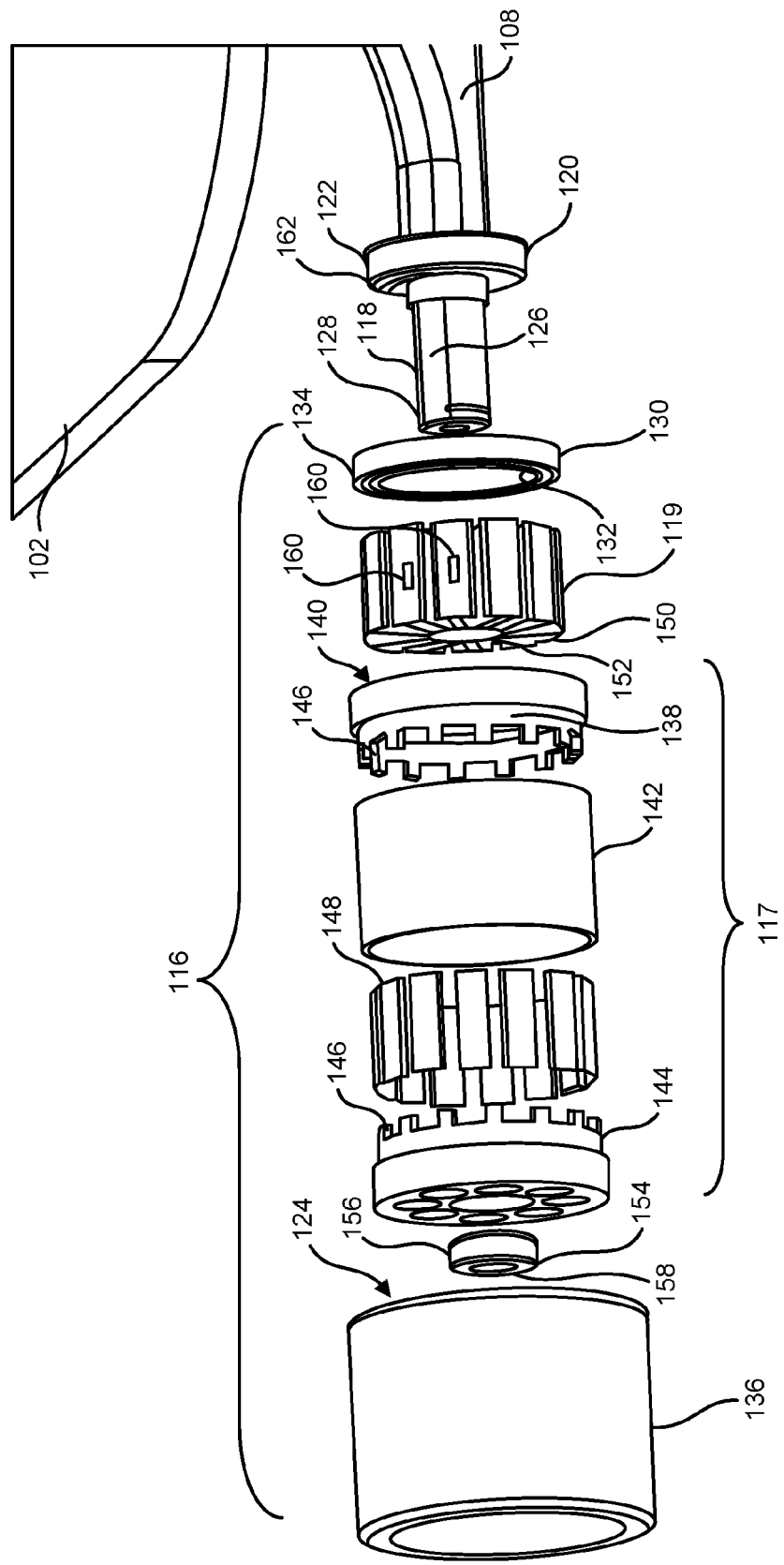
FIG. 2 is a schematic illustration of an example of a powered wheel and a portion of the skateboard, having one or more elements consistent with the current subject matter.

FIG. 2 is a schematic illustration of an example of a powered wheel 116 and a portion of the skateboard 100, having one or more elements consistent with the current subject matter. The powered wheel 116 can include an electric motor disposed within the powered wheel 116. The electric motor can include a rotor 117 and a stator 119. The rotor 117 and the stator 119 can be engaged with the axle 118 of the skateboard truck 108. The electric motor can be a three-phase electric motor. The electric motor can be a five-phase electric motor. The electric motor can be an n-phase electric motor. The powered wheel 116 can be attached to a truck 108 on a truck axle 118. The truck axle 118 can include a flange 120. The flange 120 can be configured to prohibit inward movement of the powered wheel 116. The flange can include an outer rim 122. The outer rim 122 can be configured to support an internal surface 124 of the powered wheel 116. The outer rim 122 providing support for the powered wheel 116, reducing strain on the internal components of the powered wheel 116 and the axle 118. The axle 118 can include an engagement portion 126. The engagement portion 126 can be configured to provide a surface on which the force of the powered wheel 116 can work against. Without having an engagement portion 126, the powered wheel 116 would spin about the axle 118 and provide little motive force. The axle 118 can include a retaining slot 128, configured to facilitate retaining the powered wheel 116 on the axle 118.

The powered wheel 116 can include a first bearing 130. The first bearing 130 can be configured to engage with the flange 120. The first bearing 130 can have an inner race 132 configured to engage with the surface 122 of the flange 120. The first bearing 130 can have an outer race 134 configured to engage with the inner surface 124 of a wheel 134. The inner race 132 and outer race 134 of the first bearing 130 can be rotationally engaged. Rotational capabilities of the first bearing 130 can be facilitated through the use of ball bearings, greased channels, oil channels and/or other friction reducing mechanisms between the inner race 132 and the outer race 134. In this manner, the first bearing 130 can be configured to facilitate rotation of the powered wheel 116 about the axle 118.

In some variations, the first bearing 130 can be disposed within a first rotor side 138. The first rotor side 138 can include an inner surface 140. The first rotor side 138 can comprise a center bore 140 fixedly attached to the outer race 134 of the first bearing 130. The first rotor side 138 can be a solid rotor. The first rotor side 138 can further comprise hollows bored into the inside perimeter. In some variations, the first rotor side 138 can include between 6 and 20 hollows bored into the inside perimeter. The hollows can be configured to provide airflow, reduced weight, and structural integrity. The hollows can be covered to prevent ingress of foreign bodies into the rotor. The first rotor side 138 can be visible when the powered wheel 116 is assembled. The second rotor side 144 can include a single large bore in its center adapted to fixedly attach to the outer race 156 of the second bearing 154 disposed in the center of the second rotor side 144.

The outer race 134 of the first bearing 130 can be configured to engage with the inner surface 140 of the first rotor side 138. In some variations, the first bearing 130 can have an inner diameter of between 5 mm and 10 mm. The first bearing 130 can have an outer diameter between 15 mm and 30 mm. The first bearing 130 can have a thickness between 5 mm and 10 mm. One of ordinary skill in the art will understand and appreciate that the size of the bearing is proportionate to the size of the powered wheel 116. Consequently, the presently described subject matter contemplates different sizes of first bearing 130, just as it contemplates different sizes of powered wheels 116.

The powered wheel 116 can include a rotor can 142. The rotor can 142 can comprise a material having one or more magnetic properties. The rotor can 142 can be comprised of a magnetically permeable material. The rotor can 142 can be configured to cause all or most of the magnetic field to be contained within the rotor 117. The rotor can 142 can comprise a single piece of steel alloy. The rotor can 142 can be configured to engage with at least a portion of a first rotor side 138 and a second rotor side 144. The first rotor side 138 and the second rotor side 144 can comprise one or more teeth 146. The teeth 146 can be configured to receive and support magnets 148. The teeth 146 can be configured to support the magnets 148 at specific locations. Magnets 148 can be permanent magnets. The first rotor side 138 and the second rotor side 144 can include flanges between 1 mm and 2 mm in length extending inward. In the preferred embodiment, the first rotor side 138 and the second rotor side 144 can be made of aluminum. In an alternative embodiment, the first rotor side 138 and the second rotor side 144 can be identical.

The magnets 148 can be arranged into a magnet array. Between 10 and 28 rectangular magnets 148 can be positioned within the rotor can 142. The magnets 148 can be neodymium magnets. The magnets 148 can be disposed in a circular array forming a ring. The magnets 148 can be attached to the inside of the rotor can 142 by an adhesive such as epoxy. The outer ends of the magnets 148 can lock into the teeth, or pockets 146 of the first rotor side 138 and the second rotor side 144.

The stator 119 can be configured to be disposed within the rotor 117. The stator 119 can be formed of a permanent magnet. The stator 119 can be formed of an electromagnet. The stator 119 can be formed of laminated steel. The stator 119 can comprise stator slots 150 and stator teeth 152. The stator slots 150 and stator teeth 152 can be disposed about the periphery of the stator 119. In some variations, the stator 119 can comprise a plurality of steel sheets stacked together in a circular array. The steel sheets can be fixedly attached to the axle 118. The stacks of steel sheets can form stator teeth 152. The stator slots 150 and stator teeth 152 can be configured to carry electric wire forming windings (not shown). The windings can be three-phase, five-phase, or n-phase windings. The windings can be wound copper wire. The windings can be a solid metal. The windings can be some other suitable material. The windings can be configured to carry current. A controller can be configured to cause the current to pass through successive phases of the electric motor to cause the rotor 117 to rotate about the stator 119.

A second bearing 154 can be configured to be disposed between the axle 118 and the inner surface of the stator 117. The second bearing 154 is rotationally attached to the axle 118 of the skateboard truck 108 on its inner race 158 and allows the powered wheel 116 to spin on the axle 118 by reducing rotational friction. The second bearing 154 is positioned within the inside of the stator 119 and allows the stator to spin around the outer race 156 of the second bearing 154. One of ordinary skill in the art will appreciate and understand that the size of the second bearing 154 depends on the size of the powered wheel 116 and/or the axle 118. The present disclosure contemplates different sizes of powered wheels 116 and axles 118. Consequently, the present disclosure contemplates different sizes of second bearing 154. The first bearing 130 and the second bearing 154 can be configured to facilitate rotation of the rotor 117 about the stator 119 that is fixedly engaged to the axle 118. The stator 119 can be fixedly engaged to the axle 118 by having an internal surface 152 with a shape that compliments the shape of the axle 118. The stator 119 can be held in place by a stator pin, mechanical locking groove, a circlip, or the like. The shape of the internal surface 152 can include a flat portion that compliments with the flat portion 126 of the axle 118.

The powered wheel 116 can comprise a wheel 136 configured to fit over the rotor 117. The wheel 136 can be glued or molded around the rotor 117. The wheel 136 can include an internal structure facilitating the engagement of the wheel 136 with the rotor 142. The wheel 126 can be press-fit onto the rotor 142. In some variations, the wheel 136 may be thermo cooled. The wheel 136 can serve as a tire for the powered wheel 116. The wheel 136 can be configured to mechanically engage with the rotor 117. The wheel 136 can be composed of polyurethane. The wheel 136 can be composed of rubber or any similar compound or material used for similar purposes.

In some variations, the powered wheel 116 can include wheel sizes ranging from 25 mm to 100 mm in diameter and from 25 mm to 100 mm in width.

One or more Hall effect sensors 160 can be positioned between the teeth 152 of the stator 119. The Hall effect sensor(s) 160 can be positioned at specific locations. The Hall effect sensor(s) 160 can be attached between the stator teeth of the stator 119 with adhesive. In some variations, the Hall effect sensor(s) 160 can be attached to a printed circuit board disposed between the teeth of stator teeth. The Hall effect sensor(s) 160 can be attached to the stator 119 mechanically. In some variations, the teeth 152 of the stator 119 can include pockets configured to receive the Hall effect sensor(s) 160. The hall effect sensor(s) 160 can be configured to facilitate a smooth start of the electric motor from a stationary position.

The Hall effect sensor(s) 160 can function by operating as a transducer and changing the amount of voltage it releases in relation to a magnetic field to achieve different mechanical effects. The Hall effect sensor(s) 160 can be configured to provide information about the position of the rotor to a controller (see FIG. 3A). With this information, the controller can more accurately control the flow of current to the various phases of the electric motor.

Wiring to connect the windings about the stator teeth 152 to a power source and/or a controller can be disposed along the flat portion 126 of the axle 118. The wiring can be run through an aperture 162 through the flange 120 of the axle 118.

Figure 3A:
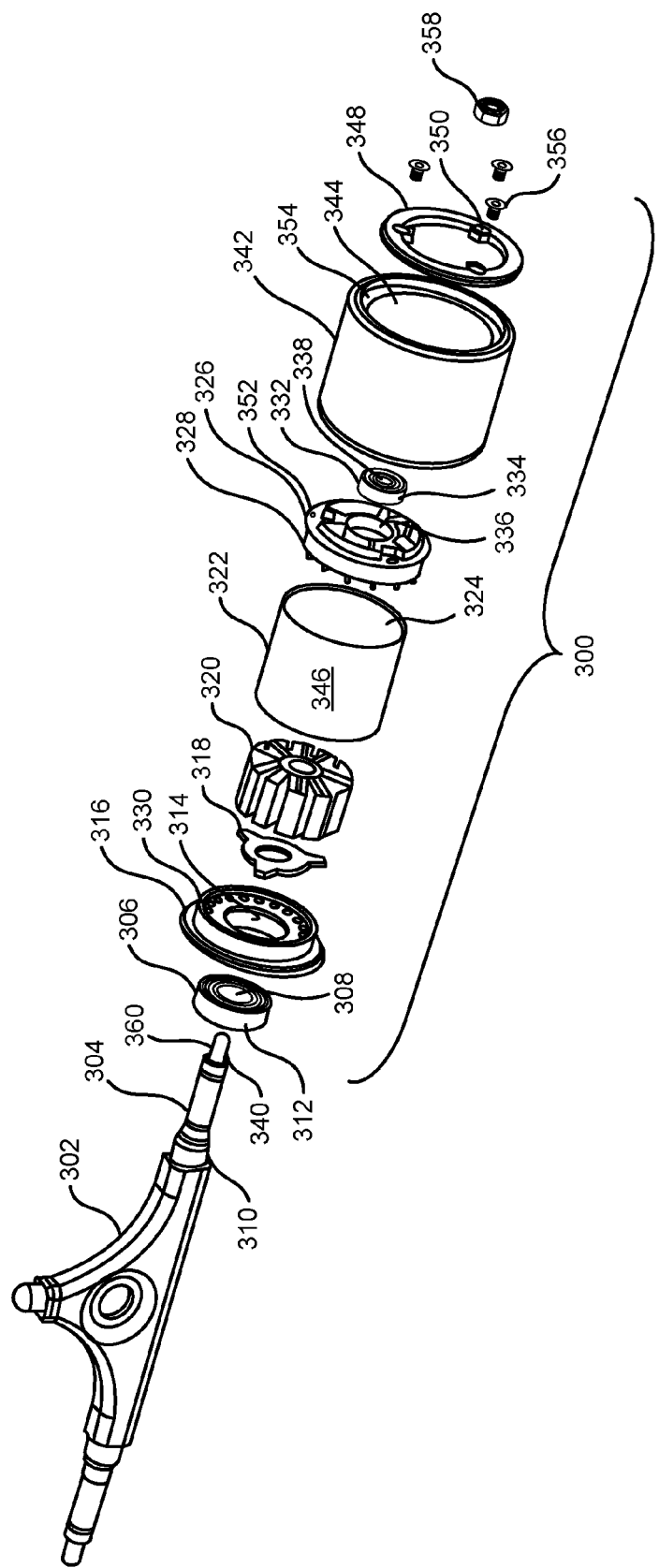
FIG. 3A is a schematic view of a powered wheel, having one or more features consistent with implementations of the current subject matter.

FIG. 3A is a schematic view of a powered wheel 300, having one or more features consistent with implementations of the current subject matter. The powered wheel 300 can be configured to attach to any type of skateboard truck. The powered wheel 300 can be configured to attach to a specialized skateboard truck. The skateboard truck 302 can include a skateboard axle 304. The powered wheel 300 can comprise a bearing 306. The bearing 306 can be similar to bearing 130 illustrated in FIG. 2. An inner race 308 of the bearing 306 can be configured to engage with at least a portion 310 of the axle 304 of the skateboard truck 302. An outer race 312 of the bearing 306 can be configured to engage with an inner surface 314 of an inner motor support 316. Then inner motor support 316 can be a rotor side.

The powered wheel 300 can include a position encoder 318. The position encoder can be disposed between the inner motor support 316 and a stator 320. The stator 320 can be similar to stator 119 illustrated in FIG. 2. The position encoder 318 can be a mechanical encoder, an optical encoder, a magnetic encoder, a capacitive encoder and/or another type of encoder. The encoder 318 can be configured to convert the angular position of motion of the powered wheel 300 relative to the axle 304 to an analog or digital code. The analog or digital code can be used by a microprocessor (such as microprocessor 604 of FIG. 6) to determine the orientation of the stator 320 relative to the known position of the encoder 318. The position encoder 318 can include a hall effect sensor. The position encoder 318 can include a printed circuit board having one or more electrical components included thereon.

The powered wheel 300 can include a rotor can 322. The rotor can 322 can include a plurality of magnets attached to the inner surface 324 of the rotor can 322. The rotor can 322 can be a magnetic flux ring. The magnetic flux ring can be configured to provide the same or similar functionality to having a plurality of magnets attached to the inner surface 324 of the rotor can 322.

The powered wheel 300 can include an outer motor support 326. The outer motor support 326 can be a rotor side. The outer motor support 326 can include a flange 328 adapted to engage with an inner surface 324 of the rotor can 322. The inner motor support 316 can include a flange 330 adapted to engage with the inner surface 324 of the rotor can 322 opposite the outer motor support 326.

The powered wheel 300 can include an outer bearing 332. The outer bearing 332 can include an outer race 334 and an inner race 338. The outer race 334 can be configured to engage with an inner surface 336 of the outer motor support 326. The inner race 338 of the outer bearing 332 can be configured to engage with at least a portion 340 of the axle 304 of the skateboard truck 302. The inner bearing 306 and the outer bearing 332 can be configured to facilitate rotation of the inner motor support 316, stator 320, rotor can 322 and outer motor support 326 about the axle 304.

The powered wheel 300 can include a wheel 342. The wheel 342 can be comprised of plastic. Plastic suitable for the wheel 342 can include a polyurethane. The material suitable for the wheel 342 can be thermosetting material, a thermoplastic material, or a combination thereof. The material suitable for the wheel 342 can be a compound material. Additive materials can be added to the compound used to fabricate the wheel 342 to provide different properties. Different heat treatments and molding processes can be employed when making the wheel 342 to provide wheels 342 with different properties.

An inner surface 344 of the wheel 342 can be configured to engage with an outer surface 346 of the rotor can 322. In some variations, the outer surface 346 of the rotor can 322 and the inner surface 344 of the wheel 342 can include complimentary engagement portions. The engagement portions prohibiting the rotor can 322 from rotating within the wheel 342 and to facilitate transfer of torque from the rotor can 322 to the wheel 342.

A retaining ring 348 can be used to hold the wheel 342 onto the motor. The retaining ring 348 can include one or more fastener holes 350. The one or more fastener holes 350 can be aligned with one or more fastener holes 352 on the outer motor support 326. The retaining ring 348 can be configured to fit within a recess 354 of the wheel 342. Fasteners 356 can be used to secure the retaining ring 348 to the outer motor support 326.

A retaining bolt 358 can be configured to screw onto a thread portion 360 of the axle 304. The retaining bolt 358 can be configured to retain the outer bearing 332 on the axle 304.

Figure 3B:
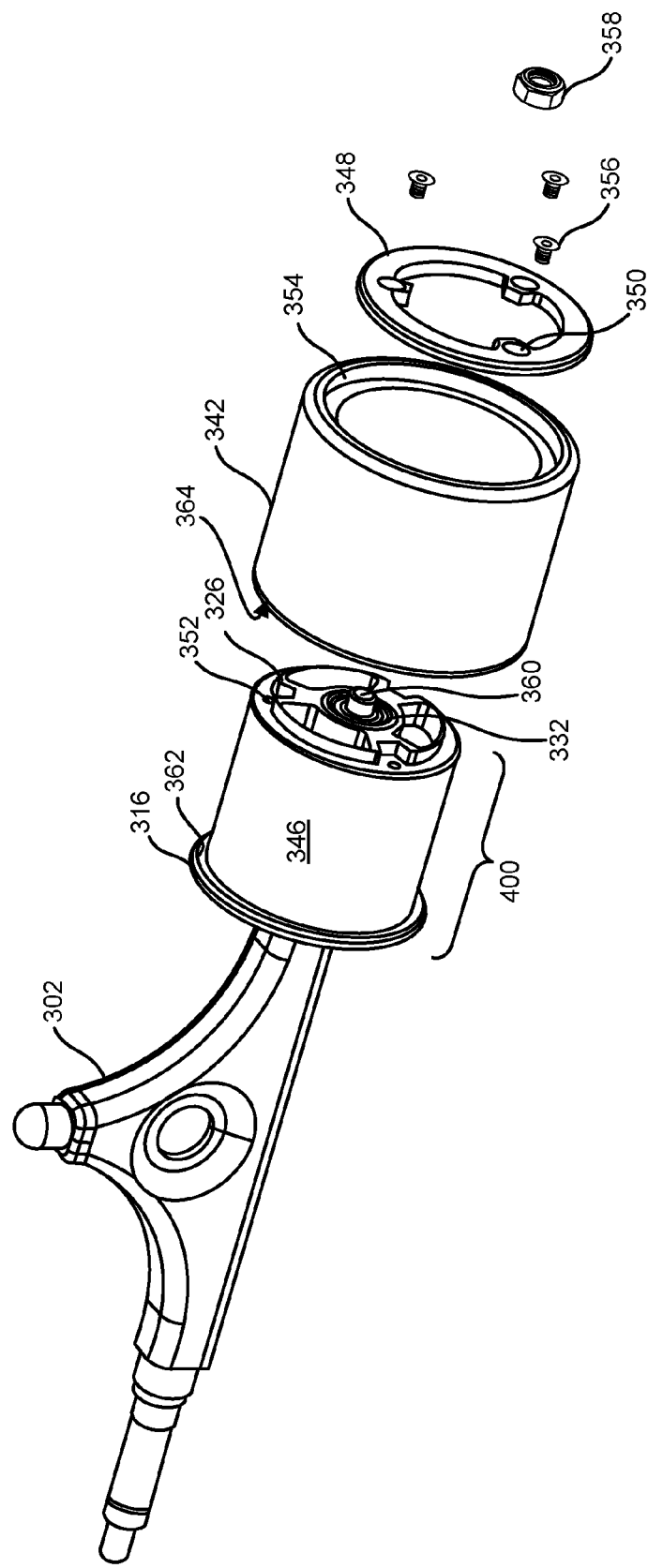
FIG. 3B is an illustration of an electric motor disposed on an axle of a skateboard truck, the electric motor having one or more elements consistent with the current subject matter.

FIG. 3B is an illustration of an electric motor 400 disposed on an axle of a skateboard truck 302, the electric motor having one or more elements consistent with the current subject matter. The inner motor support 316 can include a flange 362 configured to engage with an inner side 364 of the wheel 342. In some variations, an electric motor 400 can be provided that is preassembled as the electric motor 400. The electric motor can be disposed onto the axle of the skateboard truck 302. A wheel 342 can be positioned over the motor 400 to engage with the outer surface 346 of the rotor can 322. The retaining ring 348 can be configured to retain the wheel 342 onto the electric motor 400. The retaining nut 358 can be configured to retain the electric motor 400 on the axle of the skateboard truck 302.

Figure 3C:
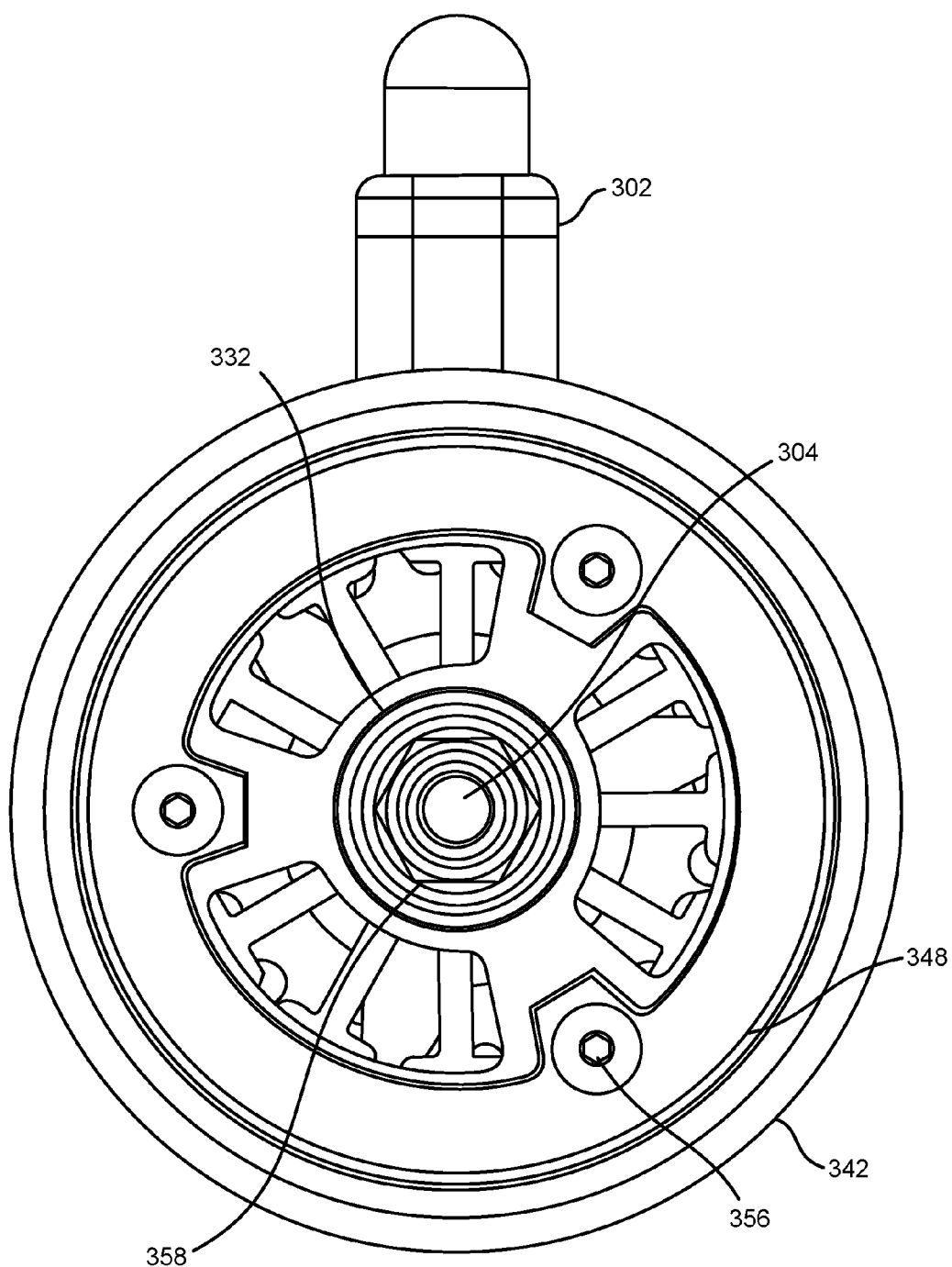
FIG. 3C is an end view of a powered wheel disposed on the axle of a skateboard truck, having one or more elements consistent with the current subject matter.

FIG. 3C is an end view of a powered wheel 116 disposed on the axle 304 of a skateboard truck 302.

Figure 4A:
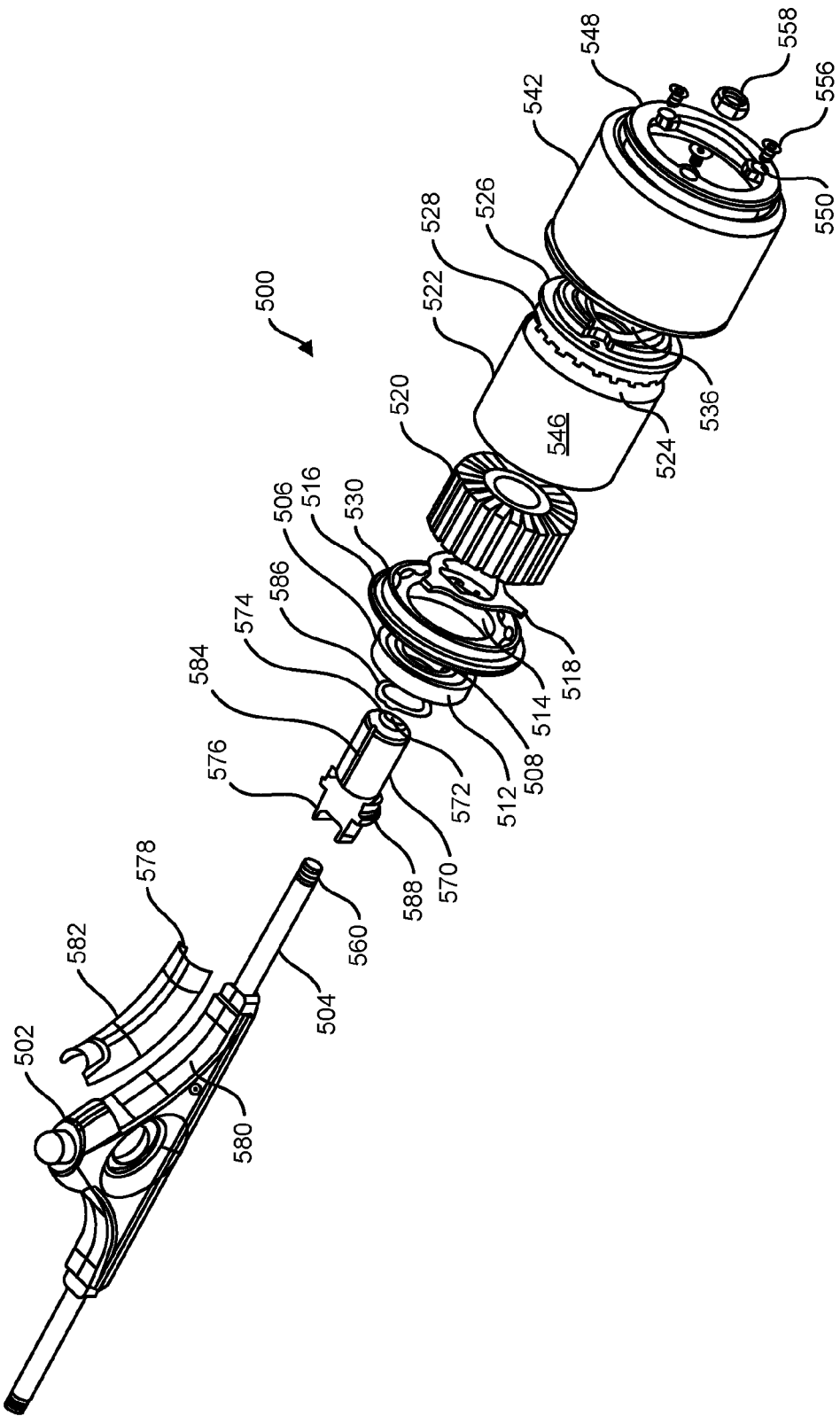
FIG. 4A is a schematic perspective view of a powered wheel, having one or more features consistent with implementations of the current subject matter.
Figure 4B:
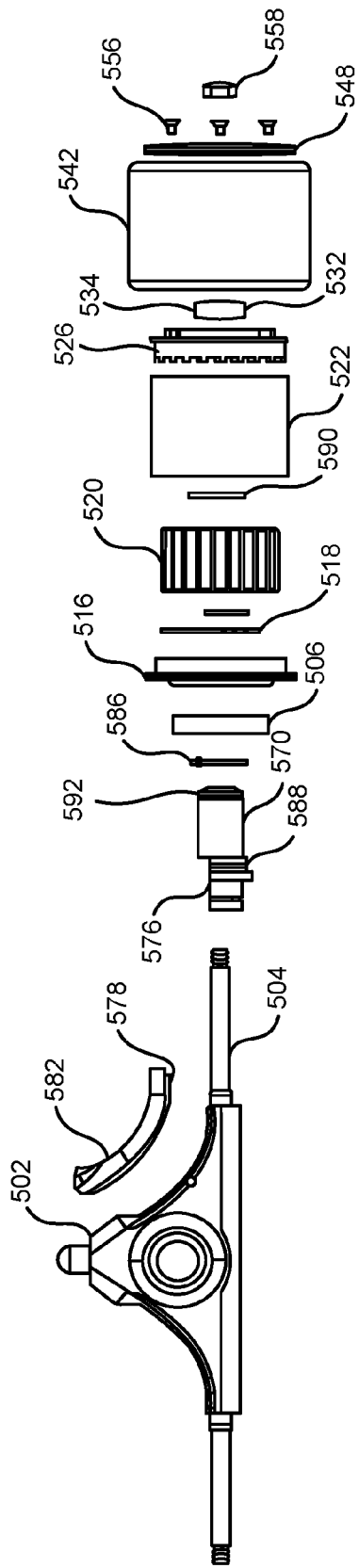
FIG. 4B is a schematic side view of the powered wheel illustrated in FIG. 4A, having one or more features consistent with implementations of the current subject matter.

FIG. 4A is a schematic perspective view of a powered wheel 500, having one or more features consistent with implementations of the current subject matter. FIG. 4B is a schematic side view of the powered wheel 500. The powered wheel 500 is similar in some aspects to the powered wheel 300 illustrated in FIG. 3A. The powered wheel 500 can be configured to attach to a skateboard truck 502. The skateboard truck 502 can be a generic skateboard truck. The skateboard truck 502 can be a specialty skateboard truck configured to engage with the powered wheel 500. The skateboard truck 502 can include a skateboard axle 504.

The powered wheel can include a hub 570. The hub 570 can include a hollow through-portion 572. The hollow through-portion 572 can be configured to receive the axle 504 of the truck 502. The hub 570 can be have a length to facilitate a threaded portion 560 of the axle 504 to extend beyond the end 574 of the hub 570. The hub 570 can include a rotational hindering portion 576. The rotational hindering portion 576 can include a flattened portion. The rotational hindering portion 576 of the hub 570 can be configured to engage with a rotational hindering portion 578 engaged with the truck 502. The rotational hindering portion 576 of the hub 570 and the rotational hindering portion 578 of the truck 502 can have complementary shapes facilitating engagement of the two rotational hindering portions.

The truck 502 can include a conduit 580. The conduit can be configured to house electrical wiring. The electrical wiring can be disposed between a power source for the powered wheel 500 and the powered wheel 500. The conduit 580 can include a conduit cover 582. In some variations, the conduit cover 582 can include the rotational hindering portion 578 of the truck 502.

The hub 570 can include a channel 584. The channel 584 can be configured to house electrical wiring to at least the stator 520 of the powered wheel 500.

The powered wheel 500 can comprise a bearing 506. The bearing 506 can be similar to bearing 306 illustrated in FIG. 3A. An inner race 508 of the bearing 506 can be configured to engage with at least a portion of the hub 570. An outer race 512 of the bearing 506 can be configured to engage with an inner surface 514 of an inner motor support 516. Then inner motor support 516 can be similar to the inner motor support 316 in FIG. 3A. A clip 586 can be employed to secure the bearing 506 into the inner motor support 516. The clip 586 can be configured to engage with a lateral groove 588 of the hub 570. The lateral groove 588 can circumvent the hub 570. The clip 586, engaged with the lateral groove 588 can prevent components of the powered wheel 500 from moving too far inward toward the truck 502.

The powered wheel can include a position encoder 518. The position encoder 518 can be similar to position encoder 318 of FIG. 3A. The position encoder 518 can include a PCB. The PCB can include one or more electrical components. The one or more electrical components can include at least one Hall effect sensor. The position encoder 518 can be disposed adjacent the stator 520. The stator 520 can be similar to stator 320 illustrated in FIG. 3A.

A rotor can 522 can be provided to surround the stator 520. The rotor can 522 can include a plurality of magnets attached to the inner surface 524 of the rotor can 522. The rotor can 522 can be a magnetic flux ring. The magnetic flux ring can be configured to provide the same or similar functionality to having a plurality of magnets attached to the inner surface 524 of the rotor can 522.

The powered wheel 500 can include an outer motor support 526. The outer motor support 526 can be similar to the outer motor support 326 of FIG. 3A. The outer motor support 526 can include a flange 528 adapted to engage with an inner surface 524 of the rotor can 522. The inner motor support 516 can include a flange 530 adapted to engage with the inner surface 524 of the rotor can 522 opposite the outer motor support 526.

The powered wheel 500 can include an outer bearing 532. The outer bearing 532 can include an outer race 534. The outer race 534 can be configured to engage with an inner surface 536 of the outer motor support 526. The inner race (not shown) of the outer bearing 532 can be configured to engage with at least a portion of the hub 570. The inner bearing 506 and the outer bearing 532 can be configured to facilitate rotation of the inner motor support 516, stator 520, rotor can 522 and outer motor support 526 about the hub 570.

The powered wheel 500 can include an outer clip 590. The outer clip 590 can be configured to inhibit the components of the powered wheel 500 from moving outward. The outer clip 590 can be configured to retain the components of the powered wheel 500 on the hub 570. The outer clip 590 can be configured to engage with an outer lateral groove 592. The outer lateral groove 592 can circumvent the hub 570.

The powered wheel 500 can include a wheel 542. The wheel 542 can be similar to wheel 342 illustrated in FIG. 3A.

The powered wheel 500 can include a retaining ring 548. The retaining ring 548 can be configured to hold the wheel 542 onto the motor. The retaining ring 548 can include one or more fastener holes 550. The one or more fastener holes 550 can be aligned with one or more fastener holes on the outer motor support 526. The retaining ring 548 can be configured to fit within a recess of the wheel 542. Fasteners 556 can be used to secure the retaining ring 548 to the outer motor support 526.

The powered wheel 500 can include a retaining bolt 558. The retaining bolt 558 can be configured to screw onto a threaded portion 560 of the axle 504. The retaining bolt 558 can be configured to retain the outer bearing 532 on the axle 504. In some variations, the outer clip 590 can be integrated with the retaining bolt 558, the retaining ring 548, a combination thereof, or the like.

In some variations, the hub 570 may include an axle binding device. The axle binding device configured to bind the hub 570 onto the axle 504. The retaining bolt 558 can be configured to retain the powered wheel 500 onto the hub 570.

Figure 5:
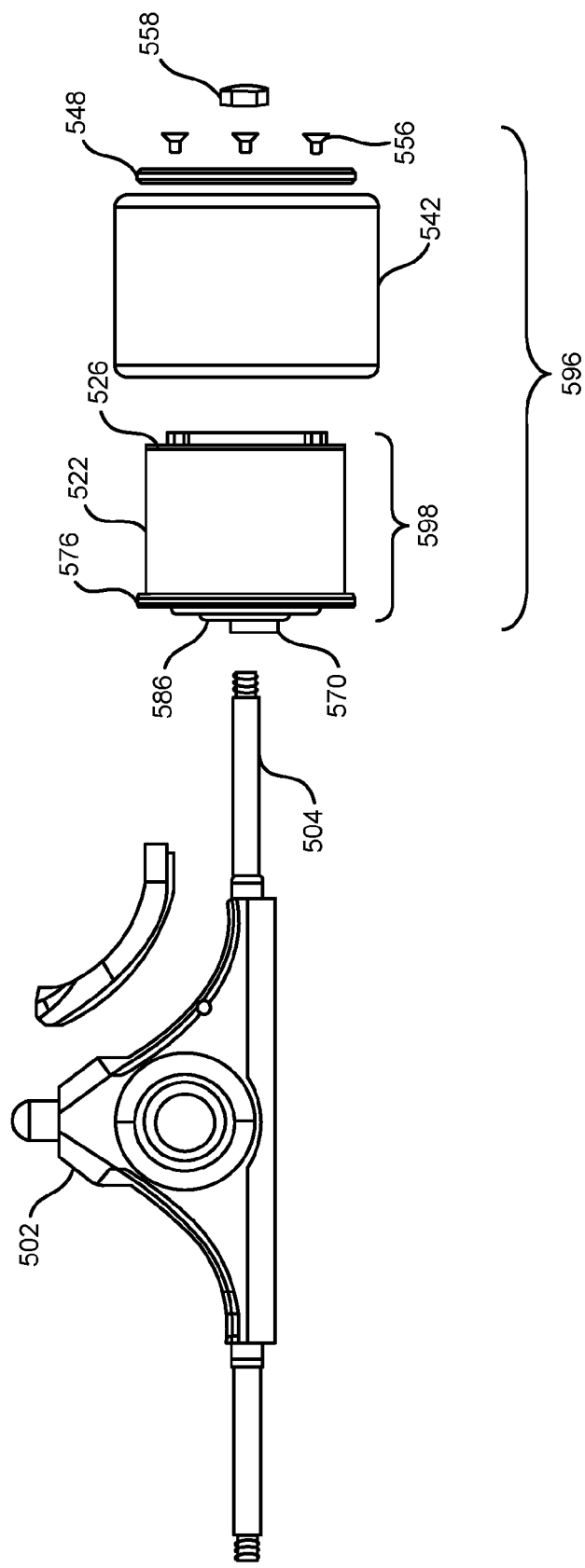
FIG. 5 is a perspective view of a commercial embodiment of the powered wheel, having one or more features consistent with implementations of the current subject matter.

FIG. 5 is an illustration of a commercial embodiment of a powered wheel 500, having one or more features consistent with the current subject matter. The powered wheel 500 may be supplied as a powered wheel unit 596. The powered wheel 500 may be supplied with the motor unit 598, the wheel 542, the retaining ring 548, fasteners 556 and retaining bolt 558 fully assembled. In some variations, the wheel 542 may be supplied separately, or replacement wheels 542 may be supplied. The retaining ring 548 and fasteners 556 can be configured to facilitate easy replacement of the wheel 542.

While the presently described powered wheels 100, 300 and 500 are illustrated and discussed in relation to being provided for a skateboard, the present disclosure contemplates that the powered wheels can be provided for any item having an axle. For example, the presently described powered wheels can be provided for luggage, bicycles, shopping carts, wheel chairs, and the like. The relative size of the components of the presently described powered wheels can be modified to fit the intended purpose of the powered wheel and the medium on which the powered wheel is intended to be disposed.

Figure 6:
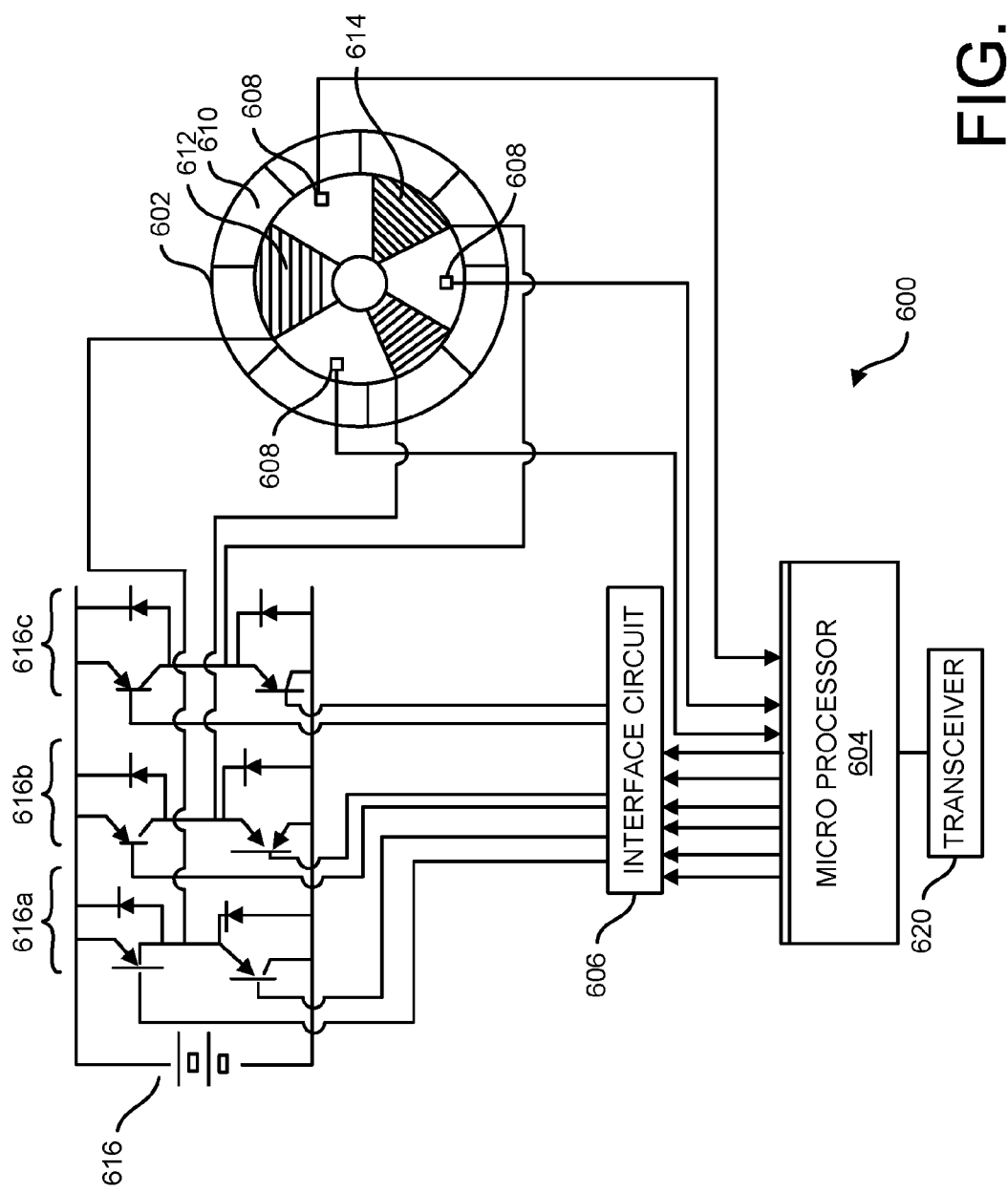
FIG. 6 is a schematic view of an electric circuit for powering an electric motor, having one or more elements consistent with the current subject matter.

FIG. 6 is a schematic view of an electric circuit 600 for powering an electric motor 602, having one or more elements consistent with the current subject matter. The electric motor 602 illustrated in FIG. 6 is a representation only. The configuration of the stator and the rotor are not intended to be limiting. The electric motor 602 may be a three-phase motor, as shown.

The electric motor 602 may be controlled by one or more microprocessors 604. The microprocessor(s) may be configured to control the electric motor 602 through an interference circuit 606. The electric motor 602 may include one or more hall sensors 608. The hall sensor(s) 608 can be configured to vary its output voltage based on the magnetic field experienced by the hall sensor(s) 608. As the rotor 610 of the electric motor rotates about the stator 612, the magnetic field at the hall sensor(s) 608 will change. The change in the magnetic field at the hall sensor(s) 608 can be measured such that the output voltage of the hall sensor(s) 308 can be mapped to the position of the stator teeth 614. Consequently, the positions of the stator teeth associated with different phases of an n-phase electric motor 602 can be known based on the output voltage of the hall sensor(s) 608. The microprocessor 604 can be configured to receive an indication of the output voltage of the hall sensor(s) 608 and control the current provided to the different phases of the n-phase motor 602.

Each phase of the n-phase motor can be associated with a rectifier 616a, 616b and 616c. While semiconductor rectifiers are illustrated, the current subject matter contemplates any type of rectifier, including vacuum tube diodes, mercury-arc valves, copper and selenium oxide rectifiers, semiconductor diodes, silicon-controlled rectifiers and other silicon-based semiconductor switches.

The electric motor 602 can be powered by a power supply 618. The power supply 618 can also be configured to provide power to the microprocessor(s) 604. The microprocessor(s) 604 can be in direct or indirect electronic communication with a transceiver 620. The transceiver 620 can be configured to transmit and/or receive signals from one or more input devices.

Figure 7:
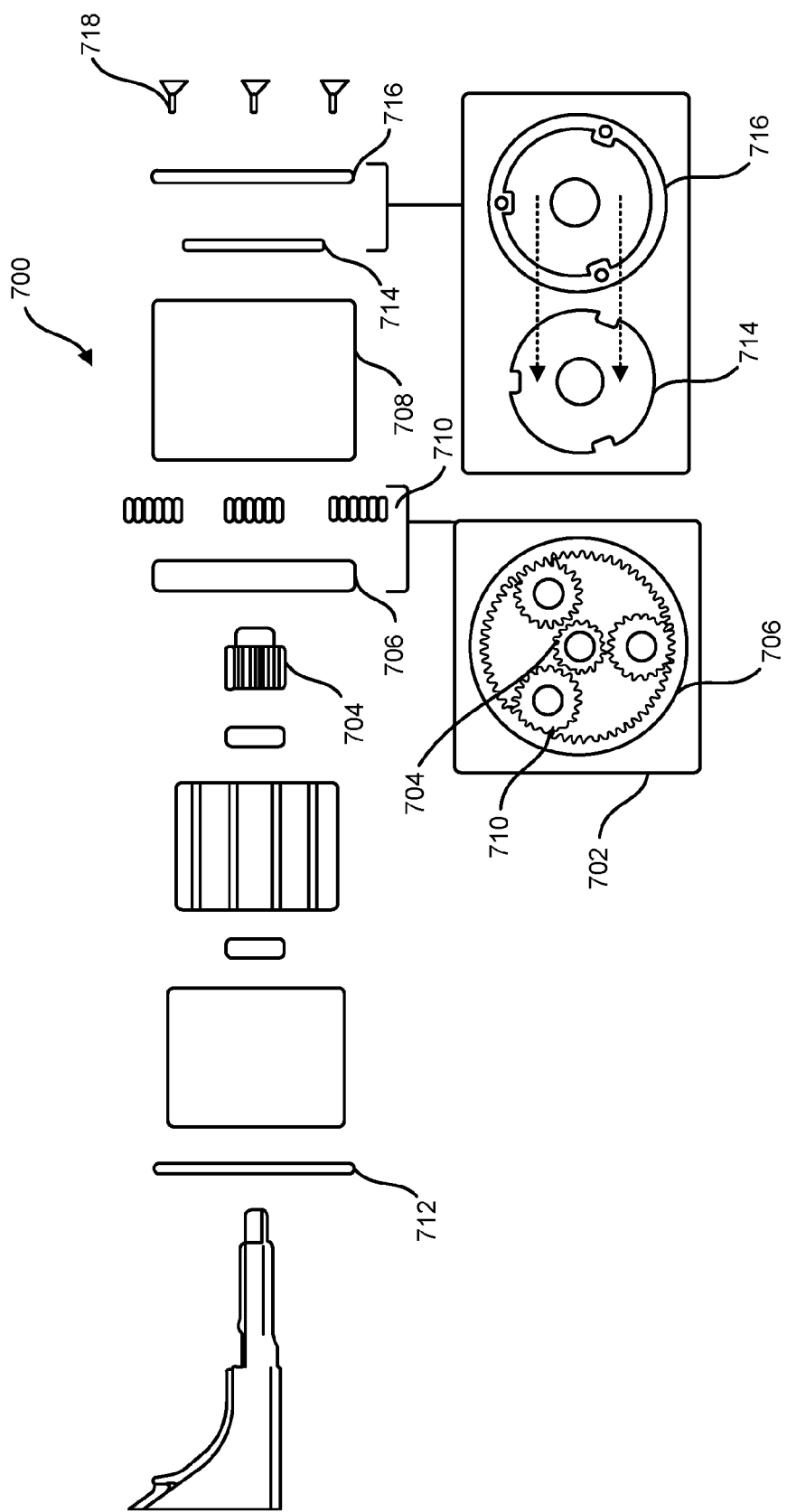
FIG. 7 is an illustration of a powered wheel having a planetary gear system having one or more elements consistent with the current subject matter.

FIG. 7 is an illustration of a powered wheel 700 having a planetary gear system 702 having one or more elements consistent with the current subject matter. The planetary gear system 702 can be disposed within the powered wheel 700. The planetary gear system 702 can include a sun gear 704. A ring gear 706 can be disposed within an inner circumference of the tire 708 of the powered wheel 700. Planetary gears 710 can be disposed between the sun gear 704 and the ring gear 706. The planetary gear system 702 can be configured to engage successive gear sets in response to the motor reaching a predefined revolution rate. The various gear sets.

The powered wheel 700 can include an inner rotor 712 disposed inward of a stator, such as stator 119. The powered wheel 700 can include an outer rotor 714 disposed outward of the planetary gear system 702. The outer rotor 714 can be configured to fit within an inner diameter of the tire 708. The powered wheel can include a retaining ring 716 or retaining plate. The retaining ring 716 can be configured to be secured to the tire 708. The retaining ring 716 can be retained to the tire 708 with screws 718.

Figure 8:
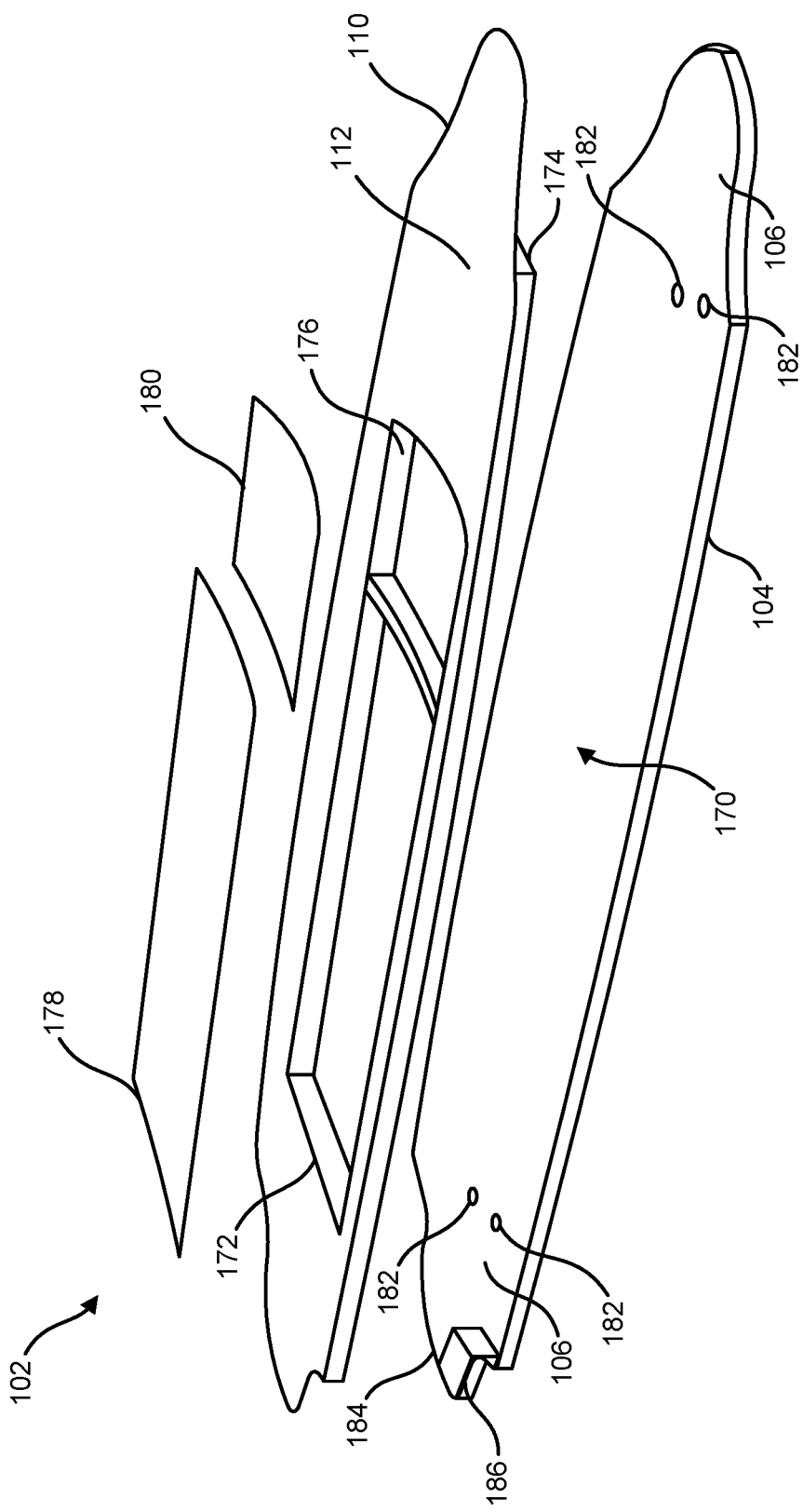
FIG. 8 is a schematic view of various elements of the skateboard deck, having one or more features consistent with implementations of the current subject matter.

FIG. 8 is a schematic view of various elements of the skateboard deck 102, having one or more features consistent with implementations of the current subject matter. The skateboard deck 102 may comprise a bottom portion 104. The bottom portion 104 may have truck mounting portions 106 configured to facilitate engagement with one or more skateboard trucks 108 (as shown in FIG. 1).

The skateboard truck(s) 108 can be made from aluminum. The skateboard truck(s) 108 can comprise an axle 118 that extends horizontally from one wheel to the other wheel. The skateboard truck(s) 108 can comprise multiple axles that extend outward from the skateboard truck(s) 108 on either side of the skateboard truck(s) 108. Each skateboard truck can be configured to have each wheel positioned between about 120 mm and about 180 mm apart. The skateboard truck(s) 108 can be mechanically attached to the skateboard by bolts.

The skateboard deck 102 may comprise a top portion 110. The top portion 110 may have an upper surface 112. The upper surface 112 may be configured to support a rider of the powered skateboard 100. The skateboard deck 102 may have a cavity 170. The cavity 170 may be disposed between the bottom portion 104 and the top portion 110 of the skateboard deck 102. The cavity 170 may be adapted to store one or more components of the powered skateboard 100.

The top portion 110 of the skateboard deck 102 may include an aperture 172. The aperture 172 may be configured to facilitate access to the cavity 170 between the top portion 110 and the bottom portion 104 of the skateboard deck 102.

The bottom portion 104 of the skateboard deck 102 may include support structures. The top portion 110 of the skateboard 102 may include support structures 174. The support structures may be configured to provide support for the top portion 110 of the skateboard deck 102 to facilitate the top portion 110 to support a rider of the powered skateboard 100. The support structure can be configured as a honeycomb structure. The support structure can include one or more lateral and/or longitudinal support structures.

In some variations of the current subject matter, the top portion 110 of the skateboard deck 102 may comprise multiple apertures 172, 176. One aperture 172 may be configured to facilitate access to components of the powered skateboard 100 that may be regularly removed. Such regularly removed components may include a fuel source for the powered skateboard 100 and/or a container for the fuel source of the powered skateboard 100. Another aperture 176 may be configured to facilitate access to components of the powered skateboard 100 that are not regularly removed. Such components not regularly removed may be control systems for controlling the powered skateboard.

The components may include a transceiver 620 (as shown in FIG. 6) configured to communicate with one or more mobile devices. The transceiver 620 may be one or more of a WiFi transceiver, a Bluetooth transceiver, a Near-Field-Communication transceiver, a sub-gigahertz transceiver, and/or any other wireless communication transceiver. The transceiver 620 may be in electronic communication with the control system for the powered skateboard. The control system may be configured to modify one or more parameters of the powered skateboard.

A lid 178 can be provided for the aperture 172. The lid 178 can be configured to cover the aperture 172 and provide support to a rider of the powered skateboard 100. The lid 178 can be configured to be screwed in place to cover the aperture 172 and provide support to the rider. The lid 178 can be configured to attach to the top portion 110 of the skateboard deck 102 via a hinge, a latch, a connector, or any other connection mechanism. The top portion 110 of the skateboard deck 102 can comprise slots to engage with the lid 178, such that the lid 178 can slide into the slots and cover the aperture 172 and support the rider. The lid 178 may be removably engaged with the top portion 110 of the skateboard deck 102.

Having the lid 172 removably engaged with the top portion 110 of the skateboard deck 102 can facilitate a user of the powered skateboard to access one or more components of the powered skateboard stored in the cavity 170. For example, the powered skateboard may be electrically powered. The cavity 170 can be configured to store one or more battery packs to provide electrical power to one or more electric motors of the powered skateboard. Having the lid 178 removably engaged with the top portion 110 of the skateboard deck 102 can facilitate a user to exchange a spent battery pack with a charged battery pack. A user may, therefore, be able to continue using the powered skateboard.

In variations where the skateboard deck 102 includes multiple apertures 172, 176, the aperture 176 for providing access to non-regularly removed components of the powered skateboard 100 may be covered by a lid 180. The lid 180 for covering aperture 176 can be secured such that the lid 180 is not easily removed, and may withstand a tumbling of the skateboard or any other shock. The lid 180 for covering aperture 176 can be secured to the top portion 110 of the skateboard deck 102 using screws, adhesive, and/or other securing methods.

The skateboard deck 102 can include one or more conduits 182. The one or more conduits 182 may be configured to facilitate connections between the power source and the motive source for the powered skateboard 100. The one or more conduits 182 can be configured to facilitate connections between an electrical power source disposed in the cavity 170 of the skateboard deck 102 and one or more electric motors disposed outside of the cavity 170 of the skateboard deck 102.

Figure 12:
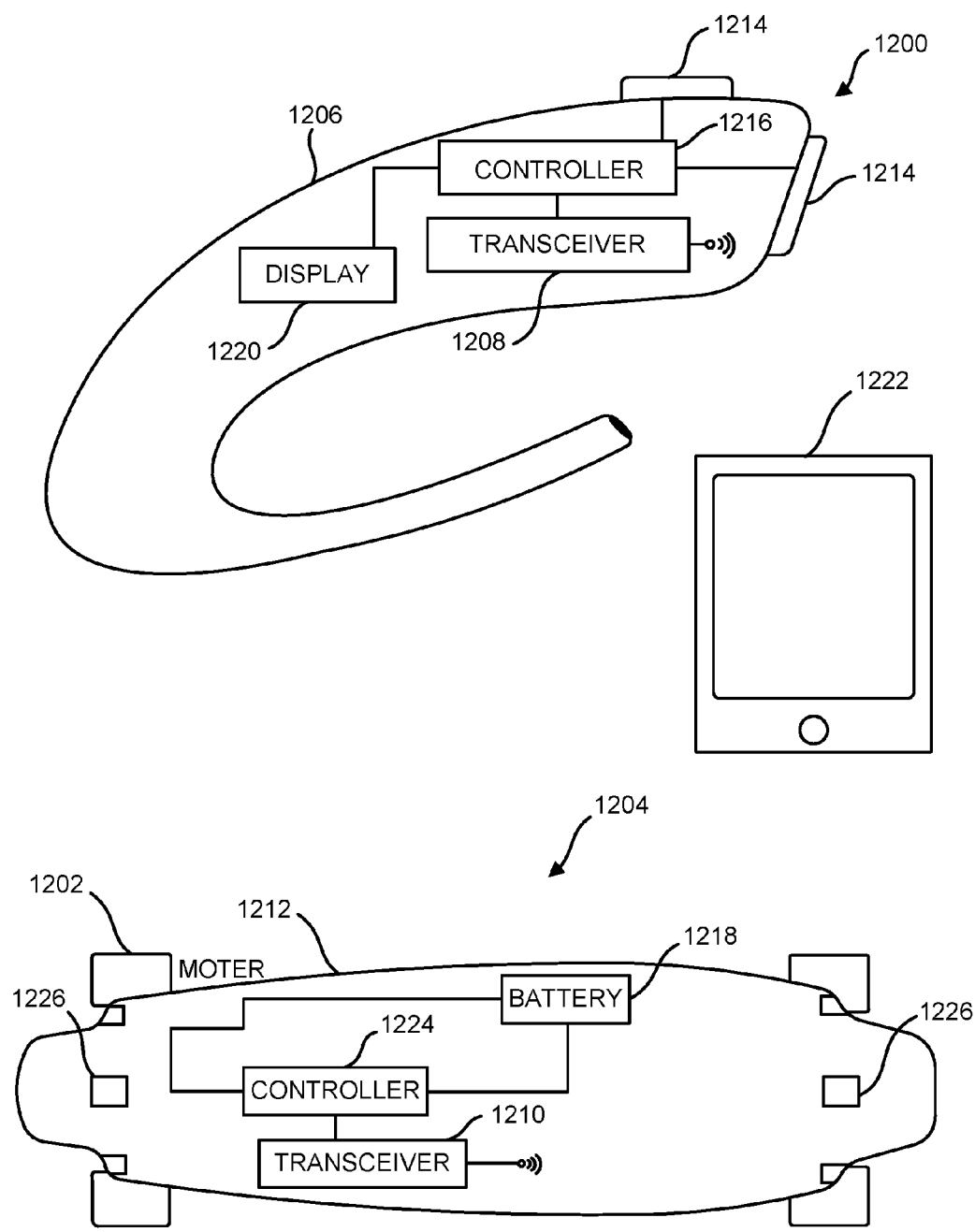
FIG. 12 is a schematic diagram of an exemplary embodiment of a system for controlling a motor of a powered skateboard, having one or more elements consistent with the current subject matter.

The components stored in the cavity 170 between the top portion 110 and the bottom portion 104 of the skateboard deck 102 may include a receiver, transmitter, and/or transceiver, herein referred to as a transceiver. The transceiver may be adapted to receive instructions from a user to control the powered skateboard 100. Instructions may be received from a transmitter. The transmitter may include a hand-held transmitter (such as shown in FIG. 12).

The skateboard deck 102 can include a port aperture 184. The port aperture 184 can be configured to secure an electronic port 186 into the skateboard deck 102. The electronic port 186 can be one or more of a USB port, a FireWire port, and/or other electronic port. The electronic port 186 can be configured to facilitate communications between an external device and one or more components of the powered skateboard 100. The electronic port 186 can be configured to facilitate transfer of electrical energy to one or more components of the powered skateboard 102. The electronic port 186 may be configured to facilitate transfer of electrical energy from one or more components of the powered skateboard to an external device.

Figure 9:
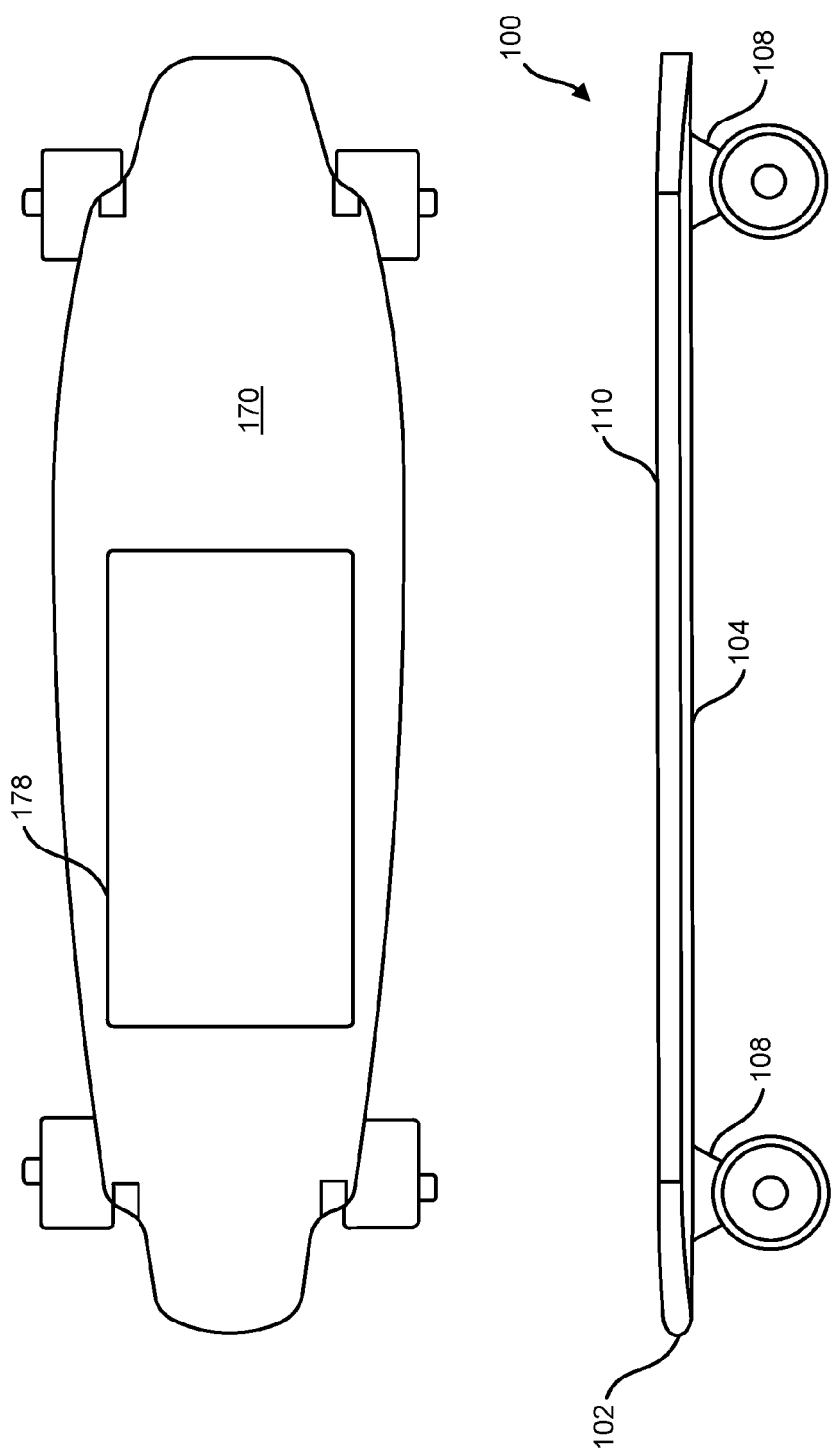
FIG. 9 is a schematic view of various elements of a powered skateboard, having one or more features consistent with implementations of the current subject matte.

FIG. 9 is a schematic view of various elements of a powered skateboard 100, having one or more features consistent with implementations of the current subject matter. The top portion 110 of the skateboard deck 102 may be secured to the bottom portion 104 of the skateboard deck 102. The top portion 110 of the skateboard deck 102 may be secured to the bottom portion 104 of the skateboard deck 102 by one or more of screws, adhesive, welding, mechanically fastening, and/or other securing mechanism. The top portion 110 of the skateboard deck 102 may be contiguous with the bottom portion 104 of the skateboard deck 102. The skateboard deck 102 may have a monocoque structure.

The skateboard deck 102 may comprise injection molded plastic. The skateboard deck 102 may comprise thermoplastic. The skateboard deck 102 may comprise carbon fiber. The skateboard deck 102 may comprise forged carbon fiber. The skateboard deck 102 may comprise pre-preg carbon fiber.

The components of the skateboard deck 102 may have a modular structure. The modular structure may have a polygonal structure. The polygonal structure may be hexagonal or rectangular. The polygonal structure may provide a lightweight structure while maintain strength and stability of the components of the skateboard deck 102.

Figure 10:
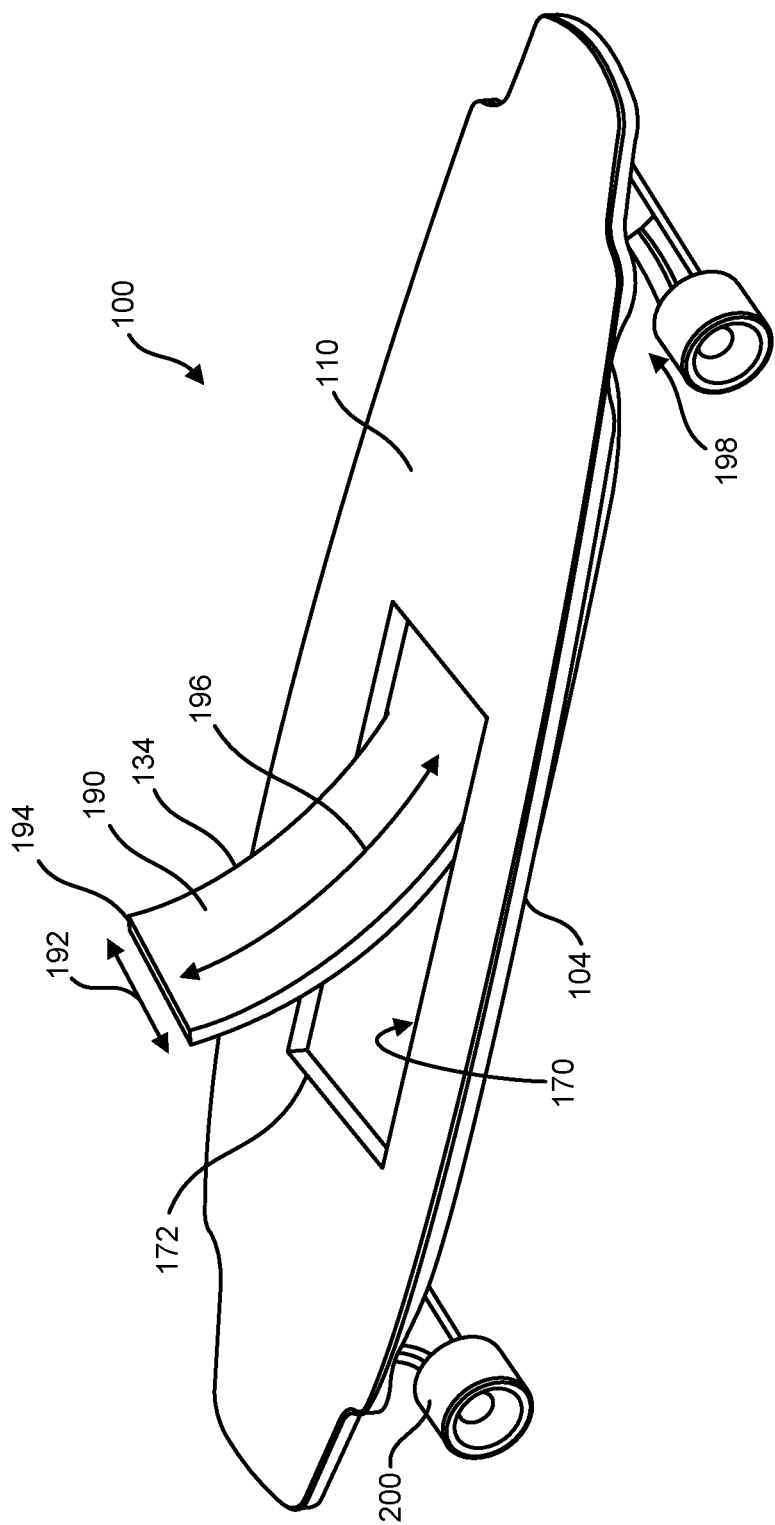
FIG. 10 is a schematic view of various elements of the powered skateboard, having one or more features consistent with implementations of the current subject matter.

FIG. 10 is a schematic view of various elements of the powered skateboard 100, having one or more features consistent with implementations of the current subject matter. The powered skateboard 100 may be electrically powered. The one or more components stored in the cavity 170 between the top portion 110 and the bottom portion 104 can include a power source for providing electric power to one or more electric motors of the electrically-powered skateboard. The power source may include a battery pack 190.

In some variations, the one or more components of the powered skateboard 100 can be stored under the deck 102 of the powered skateboard.

A battery pack 190 contemplated by the current subject matter may be interchangeable. The battery pack 190 contemplated by the current subject matter may have a width 192 suitable to fit within the cavity 170 of the skateboard deck 102 for the presently disclosed powered skateboard 100. The battery pack 190 contemplated by the current subject matter may have a thickness 194 suitable to fit within the cavity 170 of the skateboard deck 102 for the presently disclosed powered skateboard 100. The battery pack 190 contemplated by the current subject matter may have a length 196 suitable to fit between the front 198 and back 200 truck mounting portions of the skateboard deck 102. The battery pack 190 contemplated may be configured to be removable from the skateboard deck 102. For example, when a battery pack has been depleted it may be exchanged for a charged battery pack. The battery pack 190 may be flexible to facilitate removing and/or exchanging the battery pack 190 into the cavity 170 of the skateboard deck 102.

Figure 11:
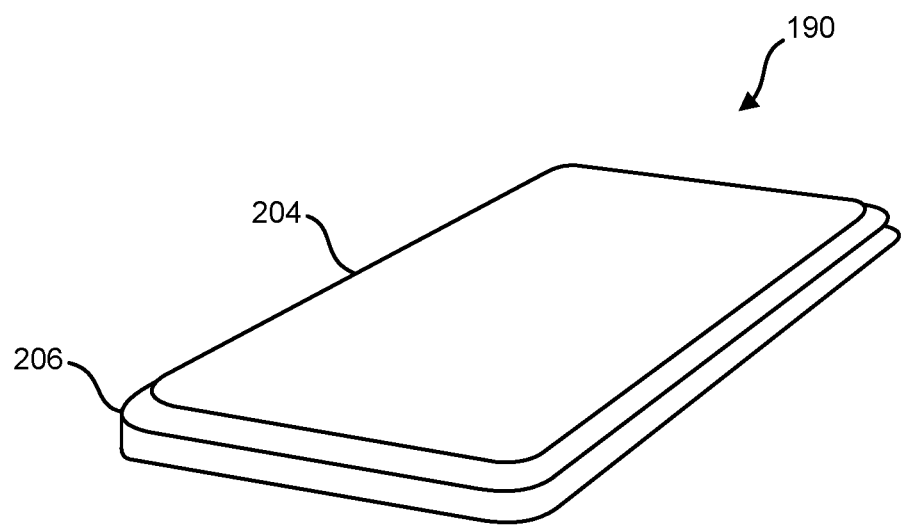
FIG. 11 illustrates a battery pack having one or more elements consistent with the current subject matter.

FIG. 11 illustrates a battery pack 190 having one or more elements contemplated by the current subject matter. The battery pack may have multiple cells. The battery pack 190 may include a casing 204. The casing 204 may have a shape and/or dimensions adapted to secure the battery pack 190 within one or more cavities 170 of the skateboard deck 102. The casing 204 may include a flange 206 encircling the battery pack 190. The flange 206 may be configured to engage with complimentary receiving portions in the cavity 170 of the skateboard deck 102. The flange 206 and complimentary receiving portions may be configured to secure the battery pack inside the cavity 170 of the skateboard deck 102. The lid 178 may facilitate securing the battery pack 190 into the cavity 170 of the skateboard deck 102.

The battery pack 190 can be a battery providing between 12 and 50 volts. The battery pack 190 can be comprised of any type of battery. The battery pack 190 can comprise a Lithium Ion type battery. The battery pack 190 can include blade or fin connectors. The battery pack 190 can include connectors to electrically connect the battery pack 190 to one or more other components of the powered skateboard 100.

In some variations, equipped with an 8 ah battery, the present embodiment is estimated to allow the presently described powered skateboard to travel an average of 10 miles at mid throttle, with a top speed estimated to be around 25 mph, which can be reduced via the motor controller program. This is a non-limiting example. The powered skateboard can be provided with any type of battery. One or more battery parameters may effect the overall performance of the powered skateboard.

The current subject matter contemplates multiple different battery packs 190 having different amounts of electrical charge stored in them. The multiple different battery packs may comprise an outer case having substantially similar dimensions. The multiple different battery packs having outer cases having substantially similar dimensions may facilitate the multiple different battery packs to be secured within the cavity of the skateboard deck regardless of the capacity of the battery pack. The cavity within the skateboard deck may be configured to secure different sized battery packs in the cavity.

FIG. 12 is a schematic diagram of an exemplary embodiment of a system 900 for controlling a motor 902 of a powered skateboard 904. The control system 900 may include a handheld device 906. The handheld device 1206 may comprise a transceiver 1208. While transceivers are illustrated in FIG. 12, transmitters and/or receivers are contemplated by the current subject matter. The illustrated transceiver 1208 is intended to represent a transceiver, a separate transmitter, a separate receiver, a single transmitter, a single receiver, multiple transmitters, multiple receivers, or any combination thereof. The transceiver 1208 can be a wireless transceiver. The wireless transceiver 1208 can be configured to transmit and/or receive radio frequency signals. The transceiver 1208 can be configured to transmit and/or receiver other signal types, such as audio signals, light signals, and/or other signals.

In some variations, a controller 1210 can be co-located with the motor 1202. The controller 1210 can be in electrical contact with the motor 1202. The controller 1210 can be embedded with the motor 1202. The controller 1210 can be disposed within the deck 1212 of the powered skateboard 1204. The transceiver 1208 in the handheld device 1206 can be configured to transmit information to, and/or receive information from, the controller 1210 in response to an input received at the handheld device 1206 through one or more of the input devices 1214 of the handheld device 1206.

Although FIG. 12 shows two input devices 1214 this is not intended to be limiting. The illustration of the two input devices 1214 is illustrative only and the current subject matter contemplates any number of input devices 1214. The input device(s) 1214 itself can be configured to receive multiple types of input from a user. The input device(s) 1214 can include one or more of a button, a slider, a wheel, a sensor, and/or other input devices. The input device(s) 1214 can be configured to detect an increase in pressure exerted by the user on the input device(s) 1214. In some variations, the input device(s) 1214 can be configured to detect a squeezing of the handheld device 1206 by the user. In some variations, the input device(s) 1214 can be variable input devices configured to detect a degree of pressure, or a degree of input, provided by the user.

The handheld device 1206 can include a controller 1216. The controller 1216 can be configured to cause the transceiver 1208 to transmit instructions to, and/or receive instructions from, the motor 1202. The instructions can control the motor 1202 in accordance with the inputs received through the input devices 1206.

The powered skateboard 1204, may include a transceiver 1210. The transceiver 1210 can be configured to transmit and/or receive information associated with the operation of the powered skateboard 1204. The transceiver 1210 can be configured to transmit and/or receive radio-wavelength signals. The transceiver 1210 can be configured to transmit and/or receive one or more of WiFi signals, Bluetooth signals, Near-Field-Communication signals, and/or other signal formats and/or wavelengths.

The transceiver 1210 can be configured to transmit information associated with the operation of the powered skateboard 1204. Where the motor 1202 is an electric motor powered by a battery 1218, the information transmitted by the transceiver 1210 can include a level of charge of the battery 1218 and/or other information associated with the battery 1218. The transceiver 1208 of the handheld device 1206 can be configured to receive information associated with the operation of the powered skateboard 1204. For example, the information received can be associated with the charge level of the battery 1218, a performance level of the motor 1202, the strength of the signal between the transceiver 1210 of the powered skateboard 1204 and the transceiver 1208 of the handheld device 1206.

The handheld device 1206 can include a display unit 1220. The display unit 1220 can be configured to display information associated with the operation of the motor 1202. The display unit can be configured to display a charge level of the battery 1218 used to provide power to the electric motor. The display unit may be an LED display, a touchscreen display, a series of lights indication a charge level, and/or any device capable of conveying to a user the transmitted information.

The handheld device 1206 and/or the powered skateboard 1204 can include a transceiver 1208, 1210, respectively, configured to communicate with external devices 1222. In some variations, the handheld device 1206 and the powered skateboard 1204 can communicate with the external devices, such as external device 1222, through one another. For example, the transceiver 1210 of the powered skateboard 1204 can communicate with the transceiver 1208 of the handheld device 1206 providing information associated with the powered skateboard 1204. The handheld device 1206 can, in turn, communicate that information with an external device, such as external device 1222. In some variations, the transceiver 1208 of the handheld device 1206 can communicate information to the transceiver 1210 of the powered skateboard 1204. The powered skateboard 1204 can, in turn, cause the information to be transmitted to the external device 1222.

Information provided by the handheld device 1206 and/or the powered skateboard 1204, to the external device 122 may include, but not be limited to, battery charge information, speed information, mode of operation information, acceleration information, status information, error information, damage information, a mode of operation of the motive device, a length of time of operation of the motive device and other information associated with the motive device. The external device 1222 can include one or more of a smartphone, a tablet, a computer, a laptop, a smartwatch, a vehicle, and/or other external device capable of receiving the information. The external device 1222 can facilitate presentation of information associated with the powered skateboard 1204 and/or handheld device 1206 to a user. For example, the external device 1222 can facilitate the presentation of the maximum speed, maximum acceleration, average speed, average acceleration, length of time in operation, distance travelled, and/or other information associated with the operation of the powered skateboard 1204.

The external device 1222 may be configured to receive input. The inputs may correspond to one or more modes and/or elements of the powered skateboard 1204 and/or the handheld device 1206. Inputs and/or entries entered through an external device 1222 may select a user for the powered skateboard 1204. The powered skateboard 1204, handheld device 1206, external device 1222, and/or other devices, may be configured to store information about different users, such as user preferences. In response to receiving an indication that a particular user is going to use the powered skateboard 1204, the powered skateboard 1204 may be configured with the preferred settings of that user. Inputs and/or entries entered through an external device 1222 can render the powered skateboard 1204, inoperable. The communications between the external device 1222, the powered skateboard 1204, and/or the handheld controller 1206 can be via a wireless communication medium. Such wireless communication medium may include radio signals. Such radio signals may include Bluetooth signals and/or other short-range and/or long range radio signals.

The motor 1202 and/or the controller 1224 of the powered skateboard 1204 can be configured to have one or more modes. The one or more modes can be associated with performance characteristics of the powered skateboard 1204. For example, the powered skateboard 1204 can have beginner, advanced, eco, custom and/or other modes. Different modes may include settings, such as maximum speed, maximum acceleration, maximum distance from home, and/or other information. A user may select and/or enter a mode on the handheld device 1206. The user may select and/or enter a mode on the external device 1222. The mode selection and/or entry can be transmitted by the transceiver 1208 to the transceiver 1210 of the powered skateboard 1204. The transceiver 1210 of the powered skateboard 1204 can be connected directly with the motor 1202 or can be connected to a controller 1210. The selected and/or entered mode received from the handheld device 1206 can cause the controller 1210 and/or motor 1202 to have performance characteristics associated with the selected and/or entered mode.

One or more input devices 1214 of the handheld device 1206 can be configured to cause changes in the speed of the motor 1202. One or more input devices 1214 can be configured to cause changes in the rate of acceleration of the motor 1202. Speed and/or acceleration information may be transmitted by transceiver 1208 of the handheld device 1216 to transceiver 1210 of the powered skateboard 1204. The transceiver 1210 can be configured to provide the speed and/or acceleration information to the controller 1224 and/or the motor 1202, depending on the configuration of the handheld device 1206 and the powered skateboard 1204. One or more input devices 1214 can include a kill switch. The kill switch can be configured to deactivate the motor 1202 in response to the kill switch being activated. In some variations, the kill switch may be activated by the kill switch being pressed. In other variation, the kill switch may be activated by a user releasing the kill switch.

In some variations, the powered skateboard 1204 can include one or more pressure sensitive devices 1226. The pressure sensitive device(s) 1226 can be configured to detect a pressure exerted on the deck 1212 of the powered skateboard 1204. The pressure sensitive device(s) 1226 can be calibrated to detect the weight of a rider on the deck 1212. The pressure sensitive device(s) 1226 can be connected to the controller 1224. The controller 1224 can be configured to monitor the pressure exerted on the pressure sensitive device(s) 1226 over time. Users of the powered skateboard 1204 can develop a pattern when using the powered skateboard 1204, such that the controller 1224 can be configured to learn how a particular user exerts pressure on the deck 1212 during operation of the powered skateboard 1204. The controller 1224 can be configured to detect a situation where the user has broken their usual pattern. A user may break their usual pattern by falling off of the powered skateboard 1204. In such cases, the controller 1224 can be configured to reduce the speed of the powered skateboard 1204 and/or stop it.

The pressure sensitive device(s) 1226 can be disposed in the trucks of the powered skateboard 1204. The pressure sensitive device(s) 1226 can be disposed between the deck 1212 and the trucks of the powered skateboard 1204. The pressure sensitive device(s) 1226 can be calibrated for the user's weight during an initial set-up of the powered skateboard 1204 by the user.

Figure 13A:
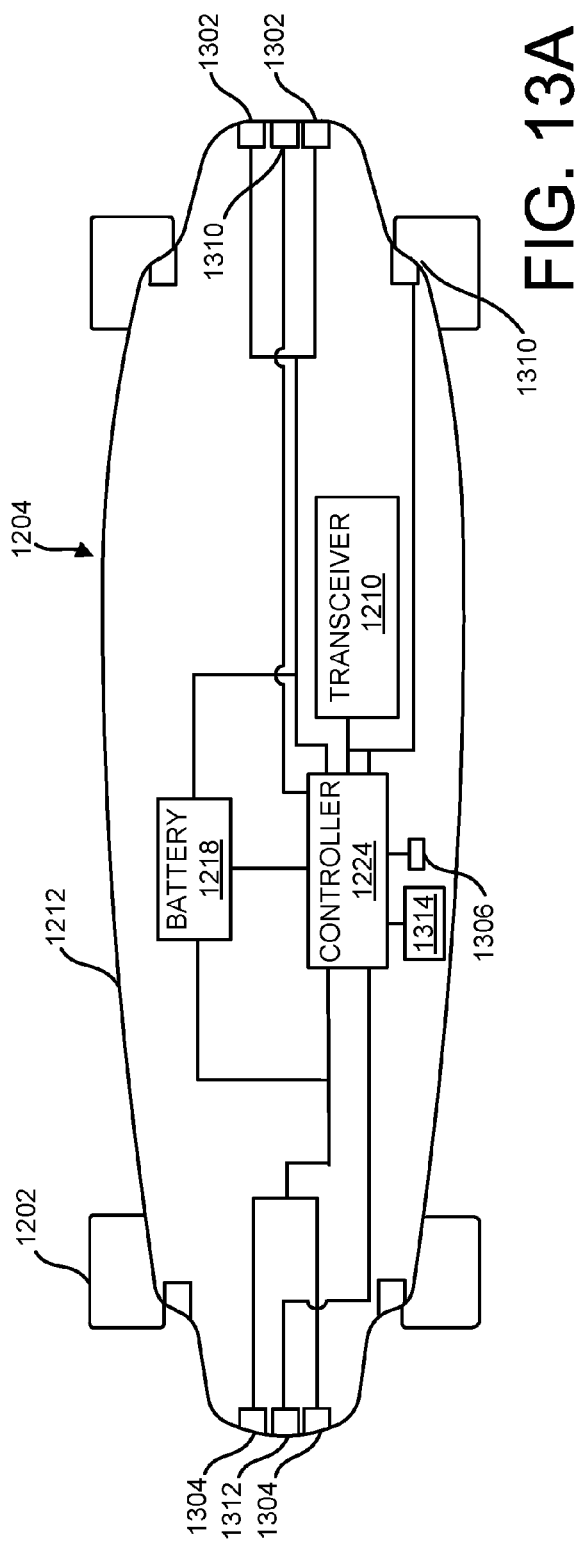
FIG. 13A is a schematic diagram of a powered skateboard, having one or more elements consistent with the current subject matter.
Figure 13B:
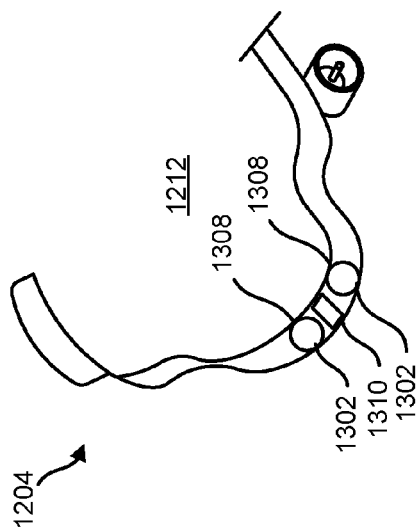
FIG. 13B is a schematic diagram of a front-end of a powered skateboard, having one or more elements consistent with the current subject matter.

FIG. 13A is a schematic diagram of a powered skateboard 1204. FIG. 13B is a schematic diagram of a front-end of a powered skateboard 1204. The powered skateboard 1204 can be similar to the powered skateboard 1204 illustrated in FIG. 12. The powered skateboard 1204 can include a deck 1212. The deck 1212 can include one or more forward facing lights 1302. The deck 1212 can include one or more rear facing lights 1304. The lights 1302 and 1304 can be powered by the battery 1218. The forward facing lights 1302 and the rear facing lights 1304 can be a light emitting diode (LED).

The powered skateboard 1204 can include a controller 1224. The controller 1224 can be configured to facilitate control of the powered skateboard 1204. The controller 1224 can be configured to control an electric motor 1202. The controller 1224 can be configured to control the lights 1302 and 1304.

The front facing lights 1302 can be configured to illuminate the direction of travel in front of the powered skateboard 1204. The front facing lights 1302 can be integrated into the skateboard deck 1212. The skateboard deck 1212 can be configured to include channels for receiving the front facing lights 1302 and the rear facing lights 1304. The skateboard deck 1212 can include ports 1308 configured to accept the lights 1302 and 1304. The ports 1308 can be configured to include water resistant material to prohibit ingress of water through the ports 1308.

The powered skateboard 1204 can include a photo sensor 1306. The photo sensor 1306 can be configured to detect when the powered skateboard 1204 is in the dark. The photo sensor 1306 can be in electronic communication with a controller 1224. In response to the photo sensor 1306 detecting that the powered skateboard 1204 is in the dark, the controller 1224 can be configured to cause the forward facing lights 1302 to illuminate. In some variations, the controller 1224 can be configured to cause the forward facing lights 1302 to illuminate at predefined times of day.

The controller 1224 can be configured to cause the rearward facing lights 1304 in response to the photo sensor 1306 detecting that the powered skateboard 1204 is in the dark. The controller 1224 can be configured to cause the rearward facing lights 1304 in response to an indication that the powered skateboard 1204 is decelerating. Deceleration of the powered skateboard 1204 that can cause the controller 1224 to cause the rearward facing lights 1304 to illuminate can include purposeful deceleration. Purposeful deceleration is deceleration cause by retardation of forward motion by the one or more motors 1202 of the powered skateboard 1204. In variations, where the rearward facing lights 1304 are illuminated due to the powered skateboard 1204 being in the dark, the controller 1224 can cause the rearward facing lights 1304 to illuminate with more intensity.

While FIGS. 13A and 13B shows lights 1302 and 1304 embedded in the skateboard 1212, the current subject matter contemplates the lights 1302 and 1304 being disposed in one or more other locations of the powered skateboard 1204.

The powered skateboard 1204 can include one or more cameras 1310, 1312. The powered skateboard 1204 can include one or more front-facing cameras 1310 and/or one or more rear-facing cameras 1312. The one or more cameras can be in electronic communication with the controller 1224. The controller 1224 can be configured to manage the cameras 1310 and 1312. The controller 1224 can include electronic data storage. The controller 1224 can be in electronic communication with electronic data storage. The cameras 1310, 1312 can be configured to obtain still images and/or video images. The video images can include multiple still images taken in quick succession. The images taken by the cameras 1310, 1312 can be stored on electronic data storage managed and maintained by the controller 1224.

In some variations, the controller 1224 can be in electronic communication with one or more motion sensors 1314. The one or more motion sensors 1314 can include a gyroscope, accelerometer, mercury switch, compass, GPS receiver, and/or other sensors. In response to an acceleration of the powered skateboard 1204 in any direction, detected by the motion sensor(s) 1314, the controller can cause the cameras 1310 and 1312 to obtain still images and/or video images. The still images and/or video images can be stored on electronic data storage.

The one or more sensors 1314 can be disposed on the powered skateboard 1204 through the skateboard deck 1212. Multiple sensors of a particular sensor type can be incorporated into the powered skateboard 1204. Multiple sensors of different sensor type can be incorporated into the powered skateboard 1204. In some variations, sensors integrated into the handheld controller 1206 and/or the external device(s) 1222 can augment information provided by the sensor(s) 1314. For example, the external device(s) 1222 can include a GPS receiver. Data received by the GPS receiver of the external device(s) 1222 can be received by the controller 1224 through a transceiver 1210 connected to the controller 1224.

Motion sensors 1314 can be configured to determine an orientation of the powered skateboard 1204. In particular, motion sensors 1314 can provide information to the controller 1224 that the powered skateboard 1204 is performing a manual, or wheelie. In some instances, a user may deliberately perform a manual. In other instances, a user may accidentally perform a manual because the their center of mass has been displaced to a position that makes them instable on the powered skateboard 1204, for example, aft of the rear axle. In circumstances where the user intends to perform a manual the user can provide input to configure the powered skateboard 1204 for performing such tricks. In circumstances where the user performs an accidental manual by having their center of mass at an unstable location, the powered skateboard 1204 can be configured to facilitate bringing the center of mass of the user forward of the rear axel.

The motion sensor(s) 1314 can provide an indication to the controller that the powered skateboard 1204 is in a manual position. FIG. 16A illustrates an example of the powered skateboard in the manual position. The motion sensor(s) 1314 can be configured to provide such indication in response to a detection that the powered skateboard has reached or exceeded a threshold angle compared the surface on which the powered skateboard it travelling. The motion sensor(s) 1314 can be configured to continuously provide an indication of the angle, and the controller 1224 can be configured to intervene when the powered skateboard is at or exceeds a threshold angle. The controller 1224 can recognize an accidental manual, which can mean that the center of mass of the rider is likely behind the rear axle or is moving toward a position behind the rear axle. In some variations, this can be verified by the powered wheels 1202 providing an indication to the controller 1224 that they are experiencing an accelerative force due to the rider's center of mass moving further rearward of the rear axle. The controller 1224 can be configured to reduce the speed of the electric wheels 1202 and in some cases reverse the electric wheels 1202 to facilitate bring the user's center of mass back in front of the rear axle of the powered skateboard 1204. FIG. 16B, is an illustration of the powered skateboard after an accidental manual has been corrected.

Figure 14:
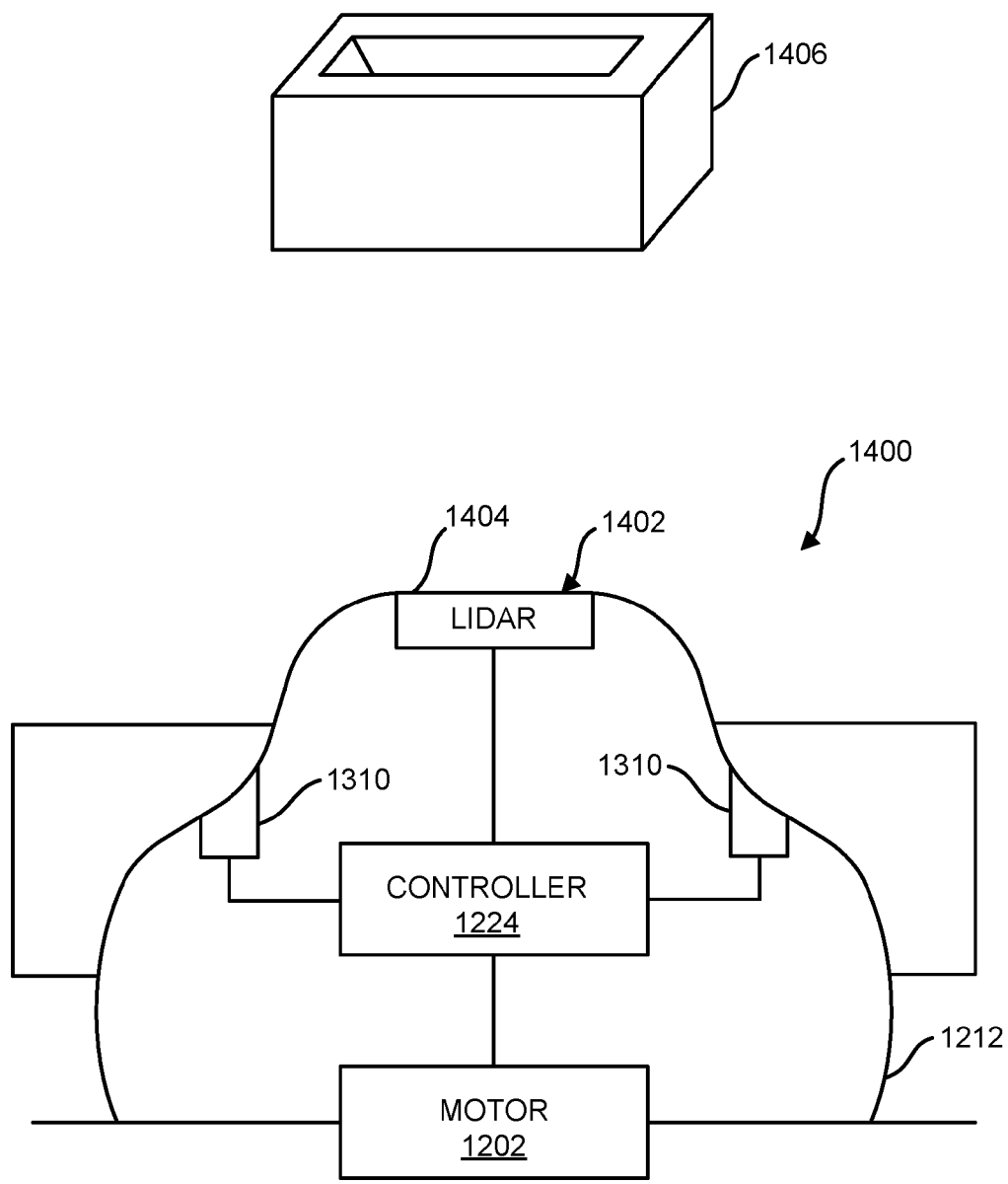
FIG. 14 is an illustration of an object avoidance system for a powered skateboard, in accordance with one or more elements of the current subject matter.

FIG. 14 is an illustration of an object avoidance system 1400 for a powered skateboard, in accordance with one or more elements of the current subject matter. The object avoidance system 1400 can include LIDAR, or stereo imaging. The object avoidance system 1400 can include an electromagnetic wave source 1402 configured to emit electromagnetic waves. The object avoidance system 1400 can include multiple electromagnetic wave sources 1402. The electromagnetic wave sources 1402 can be disposed in the deck 1212 of a powered skateboard. The electromagnetic wave sources 1402 can be disposed in the deck 1212 at various locations. The electromagnetic wave sources 1402 can include, but are not limited to ultraviolet, visible, near infrared, infrared, and other electromagnetic wave emitters. The electromagnetic waves emitted by the electromagnetic wave sources 1402 can be configured to illuminate objects 1406 within the field of the electromagnetic waves. The electromagnetic wave source 1402 can be selected to emit a wavelength corresponding to the types of objects 1406 likely to be encountered by the powered skateboard. The electromagnetic wave source 1402 can be a laser. The laser can be configured to emit light at a wavelength between 100-2000 nm. The laser can be configured to emit light at a wavelength that is not focused by the eye. For example, the laser can be configured to emit light at a wavelength of approximately 1550 nm. The electromagnetic wave source 1402 can be configured to emit a pulse of electromagnetic waves.

The object avoidance system 1400 can include a light backscattering detector 1404. The backscattering detector 1404 can be configured to detect light backscattered by one or more of Rayleigh scattering, Mie scattering, Raman scattering, fluorescence, or another type of scattering. The object avoidance system 1400 can include a scanner. The scanner can be configured to scan the backscattered light. Optics, such as mirrors and/or lenses can be used to facilitate the scanning of the backscattered light.

The backscattering detector 1404 can include a photodetector. The photodetector can include a solid state photodetector, a photomultiplier and/or another type of photodetector. The backscattering detector 1404 can include receiver electronics. The sensitivity of the receiver can be selected to facilitate object detection of the kinds of objects likely encountered by a powered skateboard.

The object avoidance system 1400 can be connected to the controller 1224. The controller 1224 can be configured to receive data signals from the detector 1404 representative of scans obtained by the detector 1404. The controller 1224 can be configured to analyze the scans to determine whether there is an obstacle in the path of the powered skateboard.

In some implementations, the object avoidance system 1400 can include one or more cameras 1310. The camera(s) 1310 can be configured to scan images of the path ahead of the powered skateboard. The camera(s) 1310 can be electronically connected to a controller 1224. The controller 1224 can be configured to determine whether there is an obstacle in the path of the powered skateboard.

In response to determining that there is an obstacle in the path of the powered skateboard, the controller 1224 can be configured to slow the powered skateboard by reducing the angular momentum of the powered wheel 1202. In some variations, the controller 1224 can be configured to slow the powered skateboard to a stop. The controller 1224 can be configured to reduce the speed of the powered skateboard to facilitate maneuver of the powered skateboard around the obstacle by the rider. The controller 1224 can be configured to stop or slow the powered skateboard based on the type or size of the obstacle detected.

In response to determining that there is an obstacle in the path of the powered skateboard, the controller 1224 can be configured to provide haptic feedback. Such haptic feedback can include a vibration. The controller 1224 can be configured to cause a connected mobile device to provide a notification. The controller 1224 can be configured to cause, by the one or more components of the powered skateboard 100, or a connected smartphone, recordation of events prior to detection of an obstacle, during detection of the obstacle, after detection of the obstacle, and the like. The object avoidance system 1400 can be activated when the powered skateboard is being operated in the dark. The object avoidance system 1400 can be configured to detect obstacles that are outside of the field of vision of the rider, or are further away than the rider can see. In some variations, the object avoidance system 1400 can detect obstacles outside of the range of the light emitted lights 1302 of the powered skateboard.

When the powered skateboard is operated in light conditions, the object avoidance system 1400 can be deactivated. Deactivating the object avoidance system 1400 during operation of the powered skateboard during light conditions can extend battery life.

Figure 15A:
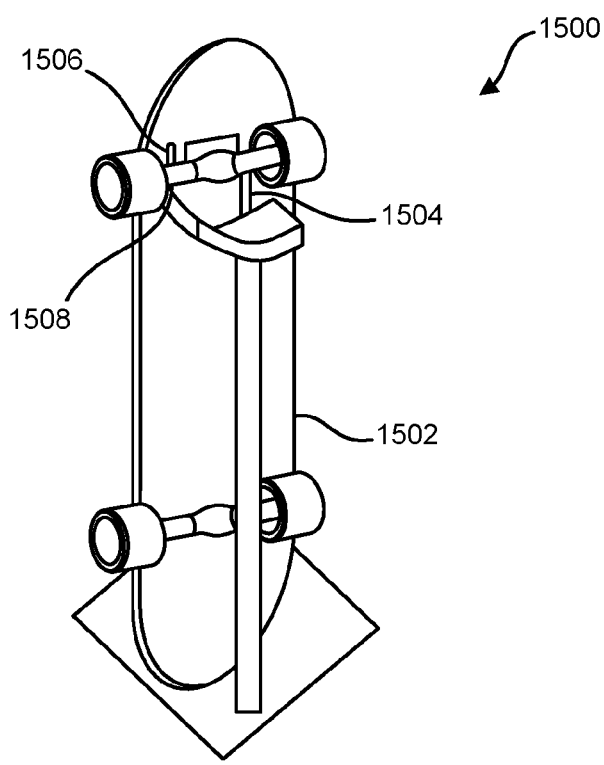
FIGS. 15A and 15B illustrate charging systems and, respectively, for a powered skateboard in accordance with one or more elements of the current subject matter.
Figure 15B:
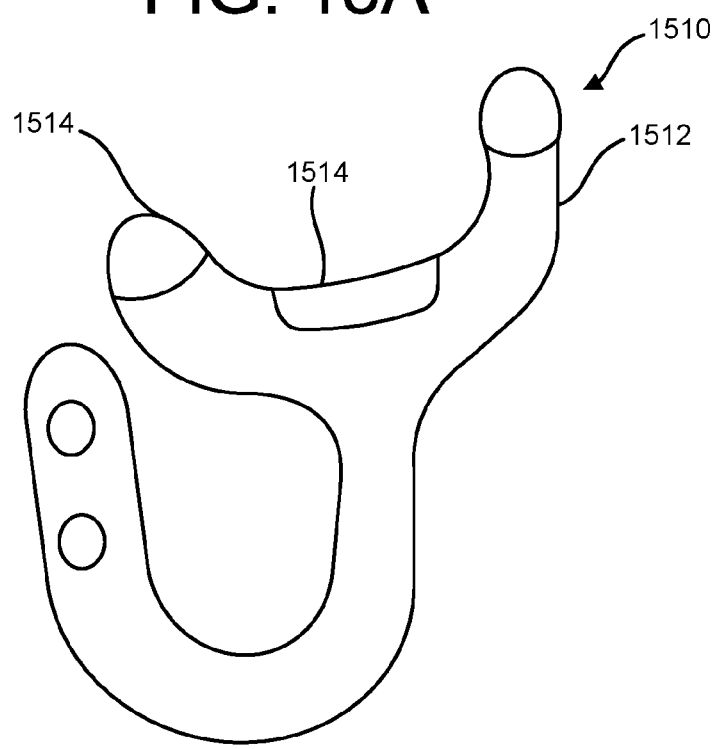

FIGS. 15A and 15B illustrate charging systems 1500 and 1510, respectively, for a powered skateboard 1502 in accordance with one or more elements of the current subject matter. Referring to FIG. 15A, the charging system 1500 for a powered skateboard 1502 can include a stand 1504. The stand 1504 can be configured to support the powered skateboard 1502. In some variations, the stand 1504 can be configured to support the powered skateboard 1502 by the trucks of the powered skateboard 1502. The stand 1504 can include one or more hooked supports 1506 configured to engage the trucks of the powered skateboard 1502. In some variations, the stand 1504 can be configured to support the powered skateboard 1502 using the wheels of the powered skateboard 1502.

In some variations, the stand can be configured to facilitate insertion of a portion of the deck of the powered skateboard 1502 into a slot of the stand. The slot can be configured to support the powered skateboard in an upright position.

Referring to FIG. 15B, the charging system 1510 can include one or more hooks 1512. The charging system 1510 may be configured to be mounted to a wall to facilitate wall-mounting the powered skateboard 1502. The charging system 1510 can include a hook 1512 to support with the powered skateboard 1502.

The powered skateboard 1502 can be configured to be charged through conductive charging. The support for the powered skateboard 1502 can include conductive charging elements at the location where the support engages with the powered skateboard 1502. Similarly, the powered skateboard 1502 can include conductive charging elements. The conductive charging elements can be integrated into the powered skateboard at the locations where the powered skateboard engages with the stand. In this way, power can be conducted from the stand to the powered skateboard, thereby charging the on-board batteries of the powered skateboard.

The powered skateboard 1502 can include conductive charging elements for a handheld controller, such as the handheld controller illustrated in FIG. 12. The handheld controller can include conductive charging elements located where the handheld controller engages with the powered skateboard 1502 when the handheld controller is hung on the powered skateboard for storage.

In some variations, the powered skateboard 1502 can include an electrical connector. The charging station for charging and supporting the powered skateboard can include an electrical connector configured to engage with the electrical connector of the powered skateboard. The electrical connectors of the charging station and the powered skateboard can be located in positions to facilitate engagement by the electrical connectors with one another when the powered skateboard is put on the stand of the charging station. Similarly, the handheld controller can include an electrical connector for engaging with a complimentary electrical connector of the powered skateboard.

In some variations, the charging station can be configured to support the handheld controller as well as the powered skateboard. The charging station can be configured to charge the handheld controller when supporting the handheld controller.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A powered skateboard, comprising:
a skateboard deck having an internal cavity configured to store one or more electrical components;
a skateboard truck disposed on a bottom portion of the skateboard deck;
a motorized wheel attached to the skateboard truck and controlled by the one or more electrical components stored in the skateboard deck, the motorized wheel configured to move the powered skateboard at variable speeds, the motorized wheel comprising:
a hub motor having a stator potion disposed at a fixed position relative to an axle of the skateboard truck;
a wheel portion configured to rotate about the stator portion; and
a releasable retaining ring configured to secure the wheel portion onto the motorized wheel; and
a motorized wheel adaptor configured to be disposed on the axle of the skateboard truck and to facilitate securing of the stator portion in fixed position onto the motorized wheel adaptor.

2. The powered skateboard of claim 1, wherein the one or more electrical components comprise:
a battery for providing power to the motorized wheel; and
a controller for controlling the variable speeds of the motorized wheel.

3. The powered skateboard of claim 1, wherein the motorized wheel comprises a planetary gear system.

4. The powered skateboard of claim 1, wherein the controller is configured to, at least, control the motorized wheel based on a control signal received through a transceiver.

5. The powered skateboard of claim 2, further comprising a motion sensor and wherein the controller is configured to, at least:
monitor an angle of elevation of a front portion of the skateboard deck relative to a rear portion of the skateboard deck; and
change an operation of the motorized wheel based on the monitored angle of elevation.

6. The powered skateboard of claim 5, wherein changing the operation of the motorized wheel comprises:
decreasing or reversing a power output of the motorized wheel in response to a determination that the angle of elevation of the front portion of the skateboard deck relative to the rear portion of the skateboard deck has exceeded a threshold angle.

7. The powered skateboard of claim 2, further comprising a location sensor and wherein the controller is configured to, at least:
stop providing power to the motorized wheel in response to a determination that the powered skateboard is outside of an allowed geographical region.

8. The powered skateboard of claim 2, further comprising a location sensor and wherein the controller is configured to, at least:
limit an amount of power provided to the motorized wheel based on one or more conditions associated with a geographical region in which the powered skateboard is being operated.

9. A method of making a powered skateboard, comprising:
providing a skateboard deck having an internal cavity configured to store one or more electrical components;
attaching a skateboard truck to a bottom portion of the skateboard deck; and
attaching a motorized wheel to the skateboard truck, the motorized wheel being controlled by the one or more electrical components stored in the skateboard deck and configured to move the powered skateboard at variable speeds, the motorized wheel comprising:
a hub motor having a stator potion disposed at a fixed position relative to an axle of the skateboard truck;
a wheel portion configured to rotate about the stator portion; and
a releasable retaining ring configured to secure the wheel portion onto the motorized wheel; and
installing a motorized wheel adaptor onto on the axle of the skateboard truck, the motorized wheel adapter configured to facilitate securing of the stator portion in fixed position onto the motorized wheel adaptor.

10. The method of claim 9, wherein providing a skateboard having an internal cavity configured to store one or more electrical components, the electrical components comprises:
- storing a battery in the internal cavity of the skateboard deck, the battery configured to provide power to the motorized wheel; and
- installing a controller in the internal cavity of the skateboard deck, the controller configured to control the variable speeds of the skateboard deck motorized wheel.

11. The method of claim 9, wherein the motorized wheel comprises a planetary gear system.

12. The method of claim 9, wherein the controller is configured to, at least, control the motorized wheel based on a control signal received through a transceiver.

13. The method of claim 10, further comprising:
- installing a motion sensor configured to monitor the motion of the powered skateboard, and wherein the controller is configured to, at least:
  - monitor an angle of elevation of a front portion of the skateboard deck relative to a rear portion of the skateboard deck; and
  - change an operation of the motorized wheel based on the monitored angle of elevation.

14. The method of claim 13, wherein changing the operation of the motorized wheel comprises:
- decreasing or reversing a power output of the motorized wheel in response to a determination that the angle of elevation of the front portion of the skateboard deck relative to the rear portion of the skateboard deck has exceeded a threshold angle.

15. The method of claim 10, further comprising:
- installing a location sensor and wherein the controller is configured to, at least stop providing power to the motorized wheel in response to a determination that the powered skateboard is outside of an allowed geographical region.

16. The method of claim 10, further comprising:
- installing a location sensor and wherein the controller is configured to, at least: limit an amount of power provided to the motorized wheel based on one or more conditions associated with a geographical region in which the powered skateboard is being operated.

* * * * *